US009757603B2

(12) United States Patent
Edgington et al.

(10) Patent No.: US 9,757,603 B2
(45) Date of Patent: Sep. 12, 2017

(54) POLYMER COMPOSITION

(75) Inventors: Garry Edgington, Honolulu, HI (US); Andreas Mylonakis, Kailua, HI (US)

(73) Assignee: CBI Polymers, Inc., Richardson, TX (US)

( * ) Notice: Subject to any disclaimer, the term of this patent is extended or adjusted under 35 U.S.C. 154(b) by 1017 days.

(21) Appl. No.: 13/570,479

(22) Filed: Aug. 9, 2012

(65) Prior Publication Data
US 2013/0037048 A1 Feb. 14, 2013

Related U.S. Application Data

(60) Provisional application No. 61/522,362, filed on Aug. 11, 2011.

(51) Int. Cl.
*C11D 3/37* (2006.01)
*A62D 5/00* (2006.01)
*C09D 5/20* (2006.01)
*G21F 9/30* (2006.01)
*G21F 9/16* (2006.01)
*C09D 5/16* (2006.01)

(52) U.S. Cl.
CPC ............ *A62D 5/00* (2013.01); *C09D 5/165* (2013.01); *C09D 5/20* (2013.01); *G21F 9/16* (2013.01); *G21F 9/301* (2013.01); *Y10T 428/31855* (2015.04)

(58) Field of Classification Search
CPC ............ A62D 2101/00; C11D 11/0005; C11D 17/043
USPC .......................................................... 510/221
See application file for complete search history.

(56) References Cited

U.S. PATENT DOCUMENTS

| 4,097,437 A | 6/1978 | Dhake |
| 4,241,141 A | 12/1980 | Dill ............................... 428/500 |
| 4,482,680 A | 11/1984 | Sheldon et al. ............ 525/331.4 |
| 4,598,122 A | 7/1986 | Goldenberg ...................... 525/61 |
| 4,748,049 A | 5/1988 | Charles et al. ................ 427/156 |
| 4,978,713 A | 12/1990 | Goldenberg ...................... 525/61 |
| 5,091,447 A | 2/1992 | Lomasney .................... 523/408 |
| 5,133,117 A | 7/1992 | Lomasney ..................... 29/110.5 |
| 5,143,949 A | 9/1992 | Grogan et al. ................ 523/334 |
| 5,174,929 A | 12/1992 | Janssen et al. ................ 264/2.6 |
| 5,376,527 A | 12/1994 | Robson et al. ................... 435/6 |
| 5,387,434 A | 2/1995 | Black ............................. 427/154 |
| 5,405,509 A | 4/1995 | Lomasney et al. ........... 204/130 |
| 5,418,006 A | 5/1995 | Roth et al. .................... 427/154 |
| 5,421,897 A | 6/1995 | Grawe .............................. 134/6 |
| 5,454,867 A | 10/1995 | Brothers et al. .............. 106/724 |
| 5,508,317 A | 4/1996 | Muller ............................ 522/85 |
| 5,509,969 A | 4/1996 | Grawe .............................. 134/2 |
| 5,631,042 A | 5/1997 | Becker et al. ................. 427/154 |
| 5,681,399 A | 10/1997 | Okano .............................. 134/4 |
| 5,731,057 A | 3/1998 | Montoya ........................ 428/142 |
| 5,753,563 A | 5/1998 | Guan et al. .................... 438/476 |
| 6,123,777 A | 9/2000 | Sakurai et al. .................... 134/4 |
| 6,139,963 A | 10/2000 | Fujii et al. ...................... 428/407 |
| 6,239,166 B1 | 5/2001 | Black |
| 6,682,773 B2 | 1/2004 | Scriven et al. ............... 427/154 |
| 6,710,126 B1 | 3/2004 | Hirt et al. ......................... 525/61 |
| 6,855,743 B1 | 2/2005 | Gvozdic ........................ 521/141 |
| 6,958,372 B2 | 10/2005 | Parker et al. ..................... 525/61 |
| 6,960,617 B2 | 11/2005 | Omidian et al. .............. 521/102 |
| 7,514,493 B1 | 4/2009 | Moore et al. |
| 2002/0122831 A1 | 9/2002 | Mowrey-McKee et al. . 424/616 |
| 2003/0235605 A1* | 12/2003 | Lelah ..................... A01N 25/18 424/443 |
| 2004/0013638 A1 | 1/2004 | Aubay et al. ................ 424/78.37 |
| 2004/0096589 A1 | 5/2004 | Eoga ........................... 427/385.5 |
| 2004/0108113 A1 | 6/2004 | Luke et al. |
| 2005/0049181 A1 | 3/2005 | Madhyastha ...................... 514/8 |
| 2005/0061357 A1 | 3/2005 | Steward et al. |
| 2005/0079150 A1 | 4/2005 | Gellman et al. ............ 424/78.27 |
| 2005/0277568 A1 | 12/2005 | Keenan et al. ............... 510/438 |
| 2006/0018853 A1 | 1/2006 | Watanabe |
| 2007/0275101 A1 | 11/2007 | Lu et al. ........................ 424/719 |
| 2008/0317949 A1 | 12/2008 | Edgington et al. ........... 427/154 |
| 2012/0121459 A1* | 5/2012 | Edgington ............. C11D 3/222 422/28 |

FOREIGN PATENT DOCUMENTS

| CN | 1113510 | 12/1995 |
| DE | 26 03 290 | 8/1977 |
| EP | 0 916 682 | 5/1999 |
| EP | 1 074 311 A1 | 2/2001 |
| EP | 1998907 | 2/2011 |
| JP | 60 100098 | 3/1985 |
| JP | 61 269095 | 11/1986 |
| JP | 11130602 | 5/1999 |

(Continued)

OTHER PUBLICATIONS

Further International Search Report and Written Opinion, Application No. PCT/US2012/050073, dated Jul. 10, 2013.
Thompson et al.; "Prusian Blue for Treatment of Radiocesium Poisoning"; Pharmacotherapy, 2001:21 (11): 1364-1367.
de Gennaro et al.; "Evaluation of an intermediate-silica sedimentary chabazite as exchanger for potentially radioactive cations"; Microporous and Mesoporous Materials 61 (2003) 159-165.
Barton et al.; "Chemical Processing Wastes, Recovering Fission Products"; Industrial and Engineering Chemistry, vol. 50, No. 2 (1958), pp. 212-126.
Kramer et al.; "How long do nosocomial pathogens persist on inanimate surfaces?"; *BMC Infectious Diseases*, 2006.
Weber et al.; "Outbreaks Associated with Contaminated Antiseptics and Disinfectants"; *Antimicrobial Agents and Chemotherapy*; vol. 51, No. 12; Dec. 2007; pp. 4217-4224.

(Continued)

*Primary Examiner* — Gregory Webb
(74) *Attorney, Agent, or Firm* — Renner, Otto, Boisselle & Sklar, LLP

(57) ABSTRACT

This invention relates to a polymer composition, comprising: water; a water-soluble polymer; and solid particulates of a sequestering agent. The composition may be used for decontaminating, cleaning and/or washing substrates contaminated with contaminants and/or contaminated materials.

33 Claims, No Drawings

(56) References Cited

FOREIGN PATENT DOCUMENTS

| | | |
|---|---|---|
| JP | 2001522359 | 11/2001 |
| JP | 2007091666 | 4/2007 |
| WO | 85/05294 | 12/1985 |
| WO | 96/40454 | 12/1996 |
| WO | 9847358 | 10/1998 |
| WO | 01/54836 | 8/2001 |
| WO | 03/054134 | 7/2003 |
| WO | 2005/085406 | 9/2005 |
| WO | 2006/081617 | 8/2006 |
| WO | 2006081617 | 8/2006 |
| WO | 2007/100861 | 9/2007 |
| WO | 2007100861 | 9/2007 |
| WO | 2011056288 | 5/2011 |

OTHER PUBLICATIONS

Witney et al.; "Inactivation of *Bacillus anthracis* Spores"; *Emerging Infectious Diseases*; vol. 9, No. 6, Jun. 2003; pp. 623-627.
Modec Inc., Technical Report MOD2003-1012-G dated Feb. 2003, Formulations for the Decontamination and Mitigation of CB Warfare Agents, Toxic Hazardous Materials, Viruses, Bacteria and Bacterial Spores.
Initiatives Online, vol. 7, Fall 2000, "Spotlight on the D&D Focus Area.".
Archibald et al.; "Cleaning and Decontamination using Strippable and Protective Coatings at the Idaho National Engineering and Environmental Laboratory"; Lockheed Martin Idaho Technology Company (1999).
Carboline; Alara®1146 Strippable Coating product information; Feb. 2003.
Innovative Technology Summary Report; ALARA™ 1146 Strippable Coating; Deactivation and Decommissioning Focus Area; Prepared for U.S. Department of Energy; dated Apr. 2000.
Ricciardi et al.; *Chem. Mater.*, 2005, 17, 1183-1189.
Wu et al.; *Macromolecules* 1990, 23, 2245-2251.
Bonapasta et al.; *Chem. Mater.* 2002, 14, 1016-1022.
Coker; *Industrial Engineering and Chemistry*, vol. 49, No. 3, 1957.
Technology Evaluation Report; "Evaluation of Spray-Applied Sporicidal Decontamination Technologies"; United States Environmental Protection Agency, Office of Research and Development; EPA 600/R-06/146, dated Sep. 2006.
International Search Report and Written Opinion, Application No. PCT/US2007/005181, dated Aug. 8, 2007.
Drake; Technology Evaluation Report; CBI Polymers DeconGel® 1101 and 1108 for Radiological Decontamination; dated Jun. 2011.
Co-pending U.S. Appl. No. 11/680,050, filed Feb. 28, 2007.
Co-pending U.S. Appl. No. 12/142,059, filed Jun. 19, 2008.
Co-pending U.S. Appl. No. 12/142,018, filed Jun. 19, 2008.

* cited by examiner

POLYMER COMPOSITION

This application claims priority under 35 U.S.C. §119(e) to U.S. Provisional Application 61/522,362, filed Aug. 11, 2011. The disclosure in this prior application is incorporated herein by reference.

TECHNICAL FIELD

This invention relates to polymer compositions and to methods for decontaminating, cleaning and/or washing substrates contaminated with contaminants and/or contaminated materials using the foregoing polymer compositions.

BACKGROUND

Polymer compositions are used to encapsulate and remove contaminants from substrates.

SUMMARY

This invention relates to polymer compositions that comprise water, a water-soluble polymer, and solid particulates of a sequestering agent. The invention relates to polymer compositions that comprise water, a water-soluble polymer dispersed in the water, and solid particulates of a sequestering agent dispersed in the water. This invention relates to films or coatings formed from these polymer compositions. The polymer compositions, upon dehydrating and/or cross-linking may form peelable or strippable films capable of decontaminating, cleaning and/or washing substrates, including porous and non-porous substrates, contaminated with a wide variety of contaminants and/or contaminated materials including radiological isotopes, radionuclides, bacteria, viruses, spores, fungi, chemical warfare agents, biological warfare agents, heavy metals, infectious agents, molds, yeast, yeast biofilms, pathogens, protists, prions, rickettsia, radioisotopes, hazardous waste, toxic chemicals, dirt, hydrophobic solvent, oil, grease, as well as other contaminants and/or contaminated materials. The films may be in the form of hydrogels and may be referred to as strippable or peelable hydrogels. The films may be removed by peeling, stripping, washing, wiping, scrubbing, spraying, rinsing, or a combination of two or more thereof, and the like.

The polymer composition may comprise: water; a water-soluble polymer, and solid particulates of a sequestering agent. The polymer composition may further comprise a thixotropic agent in an effective amount to allow the composition to flow freely upon being stirred, and to thicken and resist leveling and sagging when at rest after being applied to a non-horizontal substrate.

The polymer composition may further comprise a surfactant, a wetting agent, chelating agent, water-soluble sequestering agent, or a mixture of two or more thereof. The composition may further comprise a chemical neutralizer (e.g. NaOH), defoamer, or a mixture thereof. The composition may further comprise one or more pseudoplastic additives, rheology modifiers, anti-settling agents, leveling agents, pigments, dyes, plasticizers, viscosity stabilizers, viricides, fungicides, sporicides, biocides, chemical warfare agent neutralizers, biological warfare agent neutralizers, cross-linkers, humectants, neutron absorbers, catalysts, soaps, detergents, or a mixture of two or more thereof. The polymer composition may have a pH in the range from about 3 to about 9, or from about 5 to about 7.

The polymer composition may be applied to a contaminated substrate and then the composition may be dehydrated or dried and/or the polymer may be cross-linked to provide for the formation of a film. When applied to a contaminated substrate, the film may combine with the contaminants. The film combined with the contaminants may be separated (e.g., stripped, peeled, washed off, etc.) from the substrate, with the result being the removal of the contaminants from the substrate. Alternatively, the film may be applied to a clean substrate which is subjected to subsequent contamination wherein the contaminant material is deposited in or on the film and subsequently removed (e.g., stripped, peeled, washed off, etc.) with the film.

The present invention provides advantages over decontamination techniques used in the art wherein waste streams may be generated that must be contained, managed and/or further processed. For example, liquids which become radioactive may pose run-off and further contamination risks. Blasting or other mechanical removal techniques such as grinding, milling and scrubbing, generate rubble, debris and dust that may go airborne, further posing risk to personnel and spreading contamination.

The present invention may involve "painting" a surface, for example, with the polymer composition which can reach into the nooks and crannies and encapsulate and remove the offending contaminant offering an increased degree of efficacy, help prevent the airborne spread of the contamination, and eliminate the hazards and nuisance of further spread and waste processing of messy detergent and rinse solutions.

The present invention may be applicable to decontamination situations such as in the field of nuclear medicine where technologists in hospitals or other treatment facilities deal with radiological decontamination in the course of their work in and around medicine compounding areas, floors, medical equipment, operating tables, gurneys, heart stress test rooms, and the like. Similar situations may exist in research laboratories that utilize radioactive materials. The invention may be applicable to decontamination situations involving radionuclides, bacteria, viruses, infectious agents, molds, yeast, yeast biofilms, pathogens, protists, prions, rickettsia, radiological isotopes, fungi, spores, chemical and biological warfare agents, toxic chemicals, heavy metals, oil, grease, as well as other contaminants, and/or contaminated materials, and the like.

The polymer composition may be useful for absorbing, adsorbing, binding, separating and/or encapsulating transuranic isotopes and removing them from a substrate. The polymer composition may be useful for absorbing, adsorbing, binding, separating and/or encapsulating cesium, cobalt, and/or strontium and removing them from a substrate. The polymer composition may contain solid particulates of chabazite or clinoptilolite, or a mixture thereof, and may be useful for absorbing, adsorbing, binding, separating and/or encapsulating cesium, cobalt and/or strontium and removing them from a substrate.

DETAILED DESCRIPTION

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural. All combinations specified in the claims may be combined in any manner.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

The term "water-soluble" refers to a material that is soluble in water at a temperature of 20° C.

The water-soluble polymer of the invention may comprise a film-forming polymer. The polymer may be dispersed or dissolved in water, and upon evaporation of the water and/or cross-linking of the polymer, form a film. The film may be in the form of a hydrogel. The film may be in the form of a coating.

The term "biodegradable" refers to a material that degrades to form water and $CO_2$.

The term "sequestering agent" refers to a material that adsorbs, absorbs, encapsulates and/or combines with a material, which may comprise a contaminant or contaminated material. The sequestering agent may be in the form of a solid particulates dispersed in the polymer composition. The polymer composition may additionally comprise one or more water-soluble sequestering agents. The sequestering agent may comprise an absorbing agent, an adsorbing agent, a binding agent, an ion-exchange resin, a zeolite, an aluminosilicate compound, clay, activated carbon, Prussian blue, or a combination of two or more thereof. The sequestering agent may be used to induce and/or enhance the decontamination, cleaning, washing, decoloring, separation and/or removal of contaminants and/or contaminated material from a substrate, solution and/or dispersion. The contaminants and/or contaminated materials that may be sequestered using the sequestering agent may comprise metal ions, radiological isotopes, radionuclides, hydrophobic solvents, chemical warfare agents, biological warfare agents, toxic chemicals, hazardous waste, heavy metals, infectious agents, molds, yeast, yeast biofilms, spores, pathogens, protists, prions, rickettsia, bacteria, dirt, oil, grease, as well as other contaminants, contaminated materials, and the like.

The polymer composition may comprise water, a water-soluble film forming polymer, and solid particulates of a sequestering agent. The polymer composition may further comprise a thixotropic additive. The composition may further comprise a surfactant, a wetting agent, a chelating agent, a water-soluble sequestering agent, or a mixture of two or more thereof. The composition may further comprise biocide, chemical neutralizer (e.g., NaOH), defoamer, or a mixture of two or more thereof. The composition may further comprise one or more pseudoplastic additives, rheology modifiers, anti-settling agents, leveling agents, pigments, dyes, plasticizers, viscosity stabilizers, sporicides, viricides, fungicides, chemical warfare agent neutralizers, biological warfare agent neutralizers, cross-linkers, humectants, neutron absorbers, catalysts, soaps, detergents, or a mixture of two or more thereof. The polymer composition may have a pH in the range from about 3 to about 9, or from about 5 to about 7. The polymer composition may be applied to a substrate using conventional coating techniques, for example, brushing, rolling, troweling, spraying, spreading, dipping, smearing, and the like. The polymer composition may comprise a two component reactive coating composition where the two components are mixed before application, mixed at the time of application (e.g., during spraying), or applied as separate coats. The substrate may comprise a contaminated substrate wherein the film is applied to the contaminated substrate and the contaminant material is taken up by the film. Alternatively, the film may be applied to a clean substrate which is subjected to subsequent contamination wherein the contaminant material is deposited on or in the film and subsequently removed with the film. After application of the polymer composition to the substrate, the composition may be dehydrated or dried and/or the polymer may be cross-linked to form a film. Dehydration or drying may be enhanced using fans, dehumidifiers, a heat source, or a combination thereof. The contaminant material may be taken up, sorbed and/or complexed by or with the polymer composition or components of the polymer composition. The contaminant material may be on the surface of the film. The film combined with the contaminant material may be separated from the substrate leaving a non-contaminated surface or a surface with a reduced level of contamination.

The polymer composition may be used to remove dirt, biological warfare agents, chemical warfare agents, heavy metals, radioactive materials, viruses, fungi, toxic chemicals, infectious agents, molds, yeast, yeast biofilms, pathogens, protists, prions, rickettsia, radioisotopes, radionuclides, hazardous waste, bacteria, hydrophobic solvents, oil, grease, and the like, from substrates such as human skin, wounds in human skin, porous and/or non porous substrates (e.g., metal, concrete and/or polymer substrates, etc.), and the like.

The water-soluble polymer may comprise a hydrophobic backbone and hydrophilic hydroxyl groups. The polymer may comprise a block copolymer with one or more hydrophobic blocks and one or more hydrophilic blocks. The polymer may comprise vinyl alcohol repeating units. The polymer may comprise polyvinyl alcohol, a copolymer of vinyl alcohol, or a mixture thereof. The term "copolymer" may be used herein to refer to a polymer with two or more different repeating units including copolymers, terpolymers, and the like. The polymer may comprise one or more polysaccharides. The polymer may comprise a mixture of one or more vinyl alcohol polymers and/or copolymers and one or more polysaccharides. The polymer may be biodegradable. The polymer may be a cross-linkable polymer, and cross-linking agents may be included in the polymer composition to enhance cross-linking.

The polymer may comprise an atactic polyvinyl alcohol. These polymers may have a semicrystalline character and a strong tendency to exhibit both inter-molecular and intra-molecular hydrogen bonds.

The polymer may comprise repeating units represented by the formula —$CH_2$—CH(OH)— and repeating units represented by the formula —CH2-CH(OCOR)— wherein R is an alkyl group. The alkyl group may contain from 1 to about 6 carbon atoms, and in one embodiment from 1 to about 2 carbon atoms. The number of repeating units represented by the formula —$CH_2$—CH(OCOR)— may be in the range from about 0.5% to about 25% of the repeating units in the polymer, and in one embodiment from about 2 to about 15% of the repeating units. The ester groups may be substituted by acetaldehyde or butyraldehyde acetals.

The polymer may comprise vinyl alcohol repeating units and optionally vinyl acetate repeating units. The concentration of vinyl alcohol repeating units may be in the range from about 50 to about 100 mole %. The concentration of vinyl acetate repeating units may be from zero to about 50 mole %.

The polymer may comprise a poly(vinyl alcohol/vinyl acetate) structure. The polymer may be in the form of a vinyl alcohol copolymer which also contains hydroxyl groups in the form of 1,2-glycols, such as copolymer units derived from 1,2-dihydroxyethylene. The copolymer may contain up to about 20 mole % of such units, and in one embodiment up to about 10 mole % of such units.

The polymer may comprise a copolymer containing vinyl alcohol and/or vinyl acetate repeating units and repeating units derived from one or more of ethylene, propylene, acrylic acid, methacrylic acid, acrylamide, methacrylamide, dimethacrylamide, hydroxyethylmethacrylate, methyl methacrylate, methyl acrylate, ethyl acrylate, vinyl pyrrolidone, hydroxyethylacrylate, allyl alcohol, and the like. The copolymer may contain up to about 50 mole % of repeating units other than those of vinyl alcohol or vinyl acetate, and in one embodiment from about 1 to about 20 mole % of such repeating units other than vinyl alcohol or vinyl acetate.

Polyvinyl alcohols that may be used may include those available under the tradenames Celvol 523 from Celanese (MW=85,000 to 124,000, 87-89% hydrolyzed), Celvol 508 from Celanese (MW=50,000 to 85,000, 87-89% hydrolyzed), Celvol 325 from Celanese (MW=85,000 to 130,000, 98-98.8% hydrolyzed), Vinol® 107 from Air Products (MW=22,000 to 31,000, 98-98.8% hydrolyzed), Polysciences 4397 (MW=25,000, 98.5% hydrolyzed), BF 14 from Chan Chun, Elvanol® 90-50 from DuPont and UF-120 from Unitika. Other producers of polymers that may be used may include Nippon Gohsei (Gohsenol®), Monsanto (Gelvatol®), Wacker (Polyviol®) or the Japanese producers Kuraray, Deriki, and Shin-Etsu.

The polymer may comprise vinyl acetate, hydrolyzed or partially hydrolyzed vinyl acetate, and additional co-monomers. These may be obtainable, for example, as hydrolyzed ethylene-vinyl acetate (EVA), vinyl chloride-vinyl acetate, N-vinylpyrrolidone-vinyl acetate, or maleic anhydride-vinyl acetate. If the polymer is a copolymer of vinyl acetate and N-vinylpyrrolidone, the polymers available under the name Luviskol® from BASF may be used. These may include Luviskol VA 37 HM, Luviskol VA 37 E and Luviskol VA 28.

The polymer may comprise one or more water-soluble polysaccharides. These may include carboxymethylcelluloses, cellulose acetates, cellulose acetate butyrates, cellulose nitrates, ethylcelluloses, hydroxyalkylcelluloses (e.g., hydroxymethylcellulose), hydroxyalkylalkylcelluloses, methylcelluloses, starch, starch acetates, starch 1-octenylsuccinates, starch phosphates, starch succinates, hydroxyethylstarches, hydroxypropylstarches, cationic starches, oxidized starches, dextrins, or a mixture of two or more thereof.

The polymer may have a weight average molecular weight of at least about 10,000 g/mol. The polymer may have a weight average molecular weight of up to about 1,000,000 g/mol. The polymer may have a weight average molecular weight in the range from about 10,000 to about 1,000,000 g/mol, or from about 13,000 g/mol to about 250,000 g/mol, or from about 13,000 g/mol to about 186,000 g/mol.

The concentration of polymer in the polymer composition (before drying or dehydrating) may be in the range from about 0.5 to about 50% by weight, or from about 1 to about 25% by weight, or in the range from about 1 to about 20% by weight, or in the range from about 2 to about 10% by weight.

The polymer may have a hydrolysis level in the range from about 75% to about 100%, or from about 86% to about 99.3%.

The polymer composition may have a concentration of water (before drying or dehydrating) in the range from about 40 to about 99.5% by weight, or from about 60 to about 95% by weight. The water may be derived from any source. The water may comprise deionized or distilled water. The water may comprise tap water. The water may comprise sterile nanopure water.

The sequestering agent may comprise an absorbing agent, an adsorbing agent, a binding agent, an ion-exchange resin, a zeolite, a clay, activated carbon, Prussian blue, or a combination of two or more thereof to induce and/or enhance the decontamination, cleaning, washing, decoloring, separating, and/or removal of contaminant material from surfaces when the polymer composition contacts the contaminant material.

The sequestering agent may comprise aluminosilicate compounds and zeolytes including but not limited to analcime, chabazite, clinoptilolite, heulandite, natrolite, phillipsite, stilbite, titanium-coated zeolite lonsiv TIE-96, Zeolite type 13X, Zeolite 10A, Zeolite 100A, minerals and several types of clays including but not limited to montmorillonite, vermiculite, micas, muscovite, illite, fluorite, chlorite, microline, pyrite, serpentine, apatite, hydroxyapatite, hermatite, magnetite, dolomite, alumina, quartz, apatite, calcite and gibbsite, manganese dioxide, iron oxides, biotite, kaolinite, augite, hornblende, enstatite, anorthite, albite, microline, orthoclase, titanate, monosodium titanate, manganese oxide, crown ethers including but not limited to 18-crown-6 and 15-crown-5, activated carbon, crystalline silicotitanate, pillared clays, ammonium molybdophosphate, duolite CS-100, zinc hexacyanoferrates(II), copper hexacyanoferrates(II), cobalt hexacyanoferrates(II), nickel hexacyanoferrates(II), ferric ferrrocyanides (insoluble form), potassium iron ferrocyanides, potassium cobalt hexacyanoferrates, iron (III) hexacyanoferrates(II) or a mixture of two or more thereof.

Advantageously, the sequestering agent may comprise chabazite, clinoptilolite, or a mixture thereof.

The sequestering agent may comprise an adsorbing agent, an absorbing agent, an ion exchange resin or a mixture of two or more. These may include DOWEX OPTIPORE V493 and DOWEX OPTIPORE V503 (polymeric adsorbent resins from Dow Water & Process Solutions), Dowex MARATHON (a strong base anion exchange resin from Dow Water & Process Solutions), DOWEX SBR LC NG (OH) (a strong base anion exchange resin from Dow Water & Process Solutions), DOWEX™ G-26 (a strong acid cation exchange resin from Dow Water & Process Solutions), DOWEX™ 1 (a high capacity strong base anion exchange resin from Dow Water & Process Solutions), DOWEX™ RPU (a strong base anion exchange resin from Dow Water & Process Solutions), DOWEX™ TAN-1 (a strong base anion exchange resin from Dow Water & Process Solutions), DOWEX™ 1 LC NG (OH) (a high capacity ion exchange resin from Dow Water & Process Solutions), DOWEX OPTIPORE V503 (a polymeric adsorbent resin from Dow Water & Process Solutions), DOWEX OPTIPORE L493 (a polymeric adsorbent from Dow Water & Process Solutions), DOWEX MR-3 LC NG (a mixed ion exchange resin from Dow Water & Process Solutions), DOWEX MR-72 LC NG (a mixed ion exchange resin from Dow Water & Process Solutions), DOWEX MR-5 LC NG (a mixed ion exchange resin from Dow Water & Process Solutions), DOWEX MONOSPHERE MP-525C(H) (a strong acid cation exchange resin from Dow Water & Process Solutions), AMBERJET™ UP 4000 (a strongly basic anion exchange resin from Dow), AMBERJET™ 4200 (a strongly basic anion exchange resin from Dow), AMBERJET™ 4200 Cl (a strongly basic anion exchange resin from Dow), AMBERJET™ 4400 OH (a strongly basic anion exchange resin from Dow), AMBERJET 9000 OH (a strongly basic anion exchange resin from Dow), AMBERLITE FPA40 Cl (a strongly basic anion exchange resin from Dow), AMBERLITE IRA958 CL (strongly basic anion exchange resin from Dow), DOWEX MONOSPHERE 545C NG (H) (a strong acid cation exchange resin from Dow Water & Process Solutions), AMBERLITE™ IRC76 (a weak acid ion exchange from Dow Water & Process Solutions), AMBERLITE IRC747 (a weak acid ion exchange from Dow Water & Process Solutions), AMBERSEP™ GT74 (a weak acid ion exchange from Dow Water & Process Solutions), AMBERLITE™ IRN150 (a mixture of cation and anion exchange resins from Dow), AMBERLITE IRN170 (a mixture of cation and anion exchange resins from Dow), AMBERLITE IRN217 (a mixture of cation and anion exchange resins from Dow), XUS 43604.00 (a uniform particle size sequestering resin from Dow Water & Process Solutions), ADSORBSIA As500 (a titanium oxide adsorbent from Dow Water & Process Solutions), DOWEX RSC (a cation exchange resin from Dow Water & Process Solutions), DUOLITE GT73 (a sequestering resin from Rohm and Haas Co), LEWATIT TP 207 (a weakly acidic cation exchange resin from Lanxess), LEWATIT®AF 5 (a carbon-based, spherical, microporous adsorber from Lanxess), LEWATIT® MonoPlus SP 112 H 207 (a strongly acidic cation exchange resin from Lanxess), LEWATIT® MP 62 (a weakly basic anion exchange resin from Lanxess), LEWATIT® TP 260 (a weakly acidic cation exchange resin from Lanxess), LEWATIT® TP 207 (a weakly acidic cation exchange resin from Lanxess), or a mixture of two or more thereof.

The sequestering agent may be in the form of particulate solids when added to the polymer composition. The mean particle size of the solids when added to the polymer composition (that is, prior to any high shear mixing that may be used to disperse the particulate solids) may be in the range from about 1 nanometer (nm) to about 150 micrometers, or from about 1 nm to about 100 micrometers, or from about 1 nm to about 50 micrometers, or from about 1 nm to about 25 micrometers, or from about 1 nm to about 10 micrometers. The particle size may be sufficient to provide a mean value (Mv) reading of about 7 or higher, for example in the range of about 7 to about 8, on the Hegman grind gage scale.

The use of sequestering agents in solid particulate form in the polymer composition provides the advantage of improved efficacy when removing contaminants from a substrate, solution and/or dispersion. As contaminants are removed, encapsulated and/or separated by the solid particulate sequestering agent, the contaminant concentration in the polymer composition decreases. This increases the rate at which additional contaminants, or complexed contaminants, may be removed, separated, cleaned and/or washed away from substrates and dissolve, diffuse or disperse into the polymer composition. This increases the efficacy of the polymer composition to decontaminate, clean, wash, remove, separate, and/or remove contaminants and/or contaminated material from a substrate.

The concentration of the sequestering agent in the polymer composition (before drying or dehydrating) may be in the range from about 0.1 to about 20% by weight, or from about 0.1 to about 10% by weight, or from about 0.2 to about 2% by weight, or from about 0.4 to about 0.7% by weight.

The thixotropic agent may comprise one or more compounds that enable the polymer composition to thicken or stiffen in a relatively short period of time on standing at rest but, upon agitation or manipulation (e.g., brushing, rolling, spraying) to flow freely. The thixotropic agent may comprise fumed silica, treated fumed silica, clay, hectorite clay, organically modified hectorite clay, thixotropic polymers, pseudoplastic polymers, polyurethane, polyhydroxycarboxylic acid amides, modified urea, urea modified polyurethane, polyacrylic acid, carboxymethylcellulose, a derivative of cellulose, cellulose acetate, cellulose acetate butyrate, cellulose nitrate, ethylcellulose, hydroxyalkylcellulose, methylcellulose, chitosan, hyaluronic acid, starch, starch acetate, starch 1-octenylsuccinate, starch phosphate, starch succinate, hydroxyethylstarch, hydroxypropylstarch, cationic starch, oxidized starch, dextrin, or a mixture of two or more thereof. Thixotropic additives that may be used may include BYK-420, BYK-D420, BYK-E420, which are products of BYK identified as modified ureas.

The concentration of the thixotropic agent in the polymer composition (before drying) may be in the range of up to about 10% by weight, or from about 0.1 to about 10% by weight, or from about 0.5 to about 3% by weight.

The chelating agent, or chelant, may comprise one or more organic or inorganic compounds that contain two or more electron donor atoms that form coordinate bonds to metal ions or other charged particles. After the first such coordinate bond, each successive donor atom that binds may create a ring containing the metal or charged particle. The structural aspects of a chelate may comprise coordinate bonds between a metal or charged particle, which may serve as an electron acceptor, and two or more atoms in the molecule of the chelating agent, or ligand, which may serve as the electron donors. The chelating agent may be bidentate, tridentate, tetradentate, pentadentate, and the like, according to whether it contains two, three, four, five or more donor atoms capable of simultaneously complexing with the metal ion or charged particle.

The chelating agent may comprise an organic compound that contains a hydrocarbon linkage and two or more functional groups. The same or different functional groups may be used in a single chelating agent. The functional groups may include =X, —XR, —NR$_2$, —NO$_2$=NR, =NXR, =N—R*—XR,

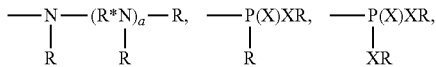

wherein X is O or S, R is H or alkyl; R* is alkylene, and a is a number ranging from zero to about 10.

Examples of chelating agents that may be used may include ethylenediaminetetraacetic acid (EDTA), diethylenetriaminepentaacetic acid (DTPA), Prussian Blue, citric acid, peptides, amino acids including short chain amino acids, aminopolycarboxylic acids, gluconic acid, glucoheptonic acid, organophosphonates, bisphosphonates such as pamidronate, inorganic polyphosphates, and the like. Salts of the foregoing chelating agents may be used. These may include sodium, calcium and/or zinc salts of the foregoing. The sodium, calcium and/or zinc salts of DTPA, especially sodium salts of DTPA, may be used. Salts of the foregoing chelating agents may be formed when neutralizing with, for example, sodium hydroxide.

The concentration of the chelating agent in the aqueous polymer composition (before drying) may be up to about 5% by weight, or in the range from about 0.1 to about 5% by weight, or from about 0.5 to about 2% by weight.

The surfactant or wetting agent may comprise one or more ionic and/or nonionic compounds having a hydrophilic lipophilic balance (HLB) in the range of zero to about 18 in Griffin's system, and in one embodiment from about 0.01 to about 18. The ionic compounds may be cationic or amphoteric compounds. Examples may include those disclosed in *McCutcheons Surfactants and Detergents*, 1998, North American & International Edition. Pages 1-235 of the North American Edition and pages 1-199 of the International Edition are incorporated herein by reference for their disclosure of such surfactants. The surfactants that may be used may include alkanolamines, alkylarylsulfonates, amine oxides, poly(oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, fatty acid amides, glycerol esters, glycol esters, sorbitan esters, imidazoline derivatives, lecithin and derivatives, lignin and derivatives, monoglycerides and derivatives, olefin sulfonates, phosphate esters and derivatives, propoxylated and ethoxylated fatty acids or alcohols or alkyl phenols, sorbitan derivatives, sucrose esters and derivatives, sulfates or alcohols or ethoxylated alcohols or fatty esters, sulfonates of dodecyl and tridecyl benzenes or condensed naphthalenes or petroleum, sulfosuccinates and derivatives, and tridecyl and dodecyl benzene sulfonic acids, polysiloxane, dimethylpolysiloxane, polyether modified dimethylpolysiloxane, polyester modified dimethylpolysiloxane, polymethylalkylsiloxane, aralkyl modified polymethylalkylsiloxane, alcohol alkoxylates, polyacrylates, polymeric fluorosurfactants, fluoro modified polyacrylates, or a mixture of two or more thereof. The surfactant may comprise sodium lauryl sulfonate, cetyltrimethyl ammonium bromide, and the like.

The concentration of the surfactant or wetting agent in the polymer composition may be in the range up to about 10% by weight of the composition (before drying), or in the range from about 0.1 to about 5% by weight, or from about 0.5 to about 2% by weight, or in the range from about 1 to about 2% by weight.

The polymer composition may further comprise one or more organic solvents, pseudoplastic additives, rheology modifiers, anti-settling agents, leveling agents, defoamers, pigments, dyes, plasticizers, viscosity stabilizers, biocides, viricides, fungicides, sporicides, chemical warfare agent neutralizers, cross-linkers, humectants, neutron absorbers, catalysts, or a mixture of two or more thereof.

The organic solvent (or co-solvent) may comprise one or more alcohols, for example, methanol, ethanol, propanol, butanol, cyclohexanol, amyl alcohol, methyl amyl alcohol, glycol, one or more ketones, for example, acetone, methyl ethyl ketone, methyl isobutyl ketone, cyclohexanone, one or more polar organic solvents, for example pentane, hexanes, benzene, toluene, xylenes, one or more acetates, for example, methyl acetate, ethyl acetate, n-butyl acetate, one or more chlorinated solvents, for example carbon tetrachloride, chloroform, trichloroethylene, or methylene chloride, one or more ethers, for example diethyl ether, methyl ethyl ether, ethylene glycol monobutyl ether, or ethylene glycol monoethyl ether, n-propyl bromide, propylene carbonate, ethyl lactate, monoethanolamine, diethanolamine, dimethylsulfoxide, n-methyl pyrollidone, n-ethyl pyrollidone, dimethylformamide, acetonitrile, limonene, tetrahydrofuran, or a mixture of two or more thereof. The concentration of the organic solvent in the polymer composition may be up to about 80% by weight of the composition (before drying), or in the range from about 0.1 to about 60% by weight, or from about 0.5 to about 40% by weight, or from about 0.5 to about 10% by weight, or in the range from about 1 to about 2% by weight. In an embodiment the organic solvent may comprise ethanol, methanol, isopropanol, or a mixture of two or more thereof, and the concentration of such solvents in the polymer composition may be in the range from about 25% to about 40% by weight. In an embodiment the organic solvent may be ethanol and its concentration in the polymer composition may be in the range from about 0.5% to about 1.5% by weight. In an embodiment the organic solvent may comprise isopropanol and its concentration in the polymer composition may be in the range from about 0.5% to about 2% by weight.

The leveling agent may comprise polysiloxane, dimethylpolysiloxane, polyether modified dimethylpolysiloxane, polyester modified dimethylpolysiloxane, polymethylalkysiloxane, aralkyl modified polymethylalkylsiloxane, alcohol alkoxylates, polyacrylates, polymeric fluorosurfactants, fluoro modified polyacrylates, or a mixture of two or more thereof. The plasticizer may comprise ethylene glycol, polyethylene glycol, propylene glycol, polypropylene glycol, butane diol, polybutylene glycol, glycerine, or a mixture of two or more thereof. The viscosity stabilizer may comprise a mono or multifunctional hydroxyl compound. These may include methanol, ethanol, propanol, butanol, ethylene glycol, polyethylene glycol, propylene glycol, polyethylene glycol, propylene glycol, polypropylene glycol, butane diol, polybutylene glycol, glycerine, or a mixture of two or more thereof. The biocide may comprise Kathon LX (a product of Rohm and Hass Company comprising 5-chloro-2-methyl-4-isothiazolin-3-one and 2-methyl-4-isothiazolin-3-one) or Dowacil 75 (a product of Dow Chemical comprising 1-(3-chloroallyl)-3,5,7-triaza-1-azoniaadamantane chloride). The cross-linker may comprise sodium tertraborate, glyoxal, Sunrez 700 (a product of Sequa Chemicals identified as cyclic urea/glyoxal/polyol condensate), Bacote-20 (a product of Hopton Technology identified as stabilized ammonium zirconium carbonate), polycup-172 (a product of Hercules, Inc. identified as a polyamide-epichlorohydrin resin), or a mixture of two or more thereof. The neutron absorber may be used to reduce criticality risk during the decontamination of fissile materials. The neutron absorber may comprise a compound which may comprise a boron atom such as sodium tetraborate. The biocide, viricide, fungicide, sporicide or biological warfare agent neutralizer may have the capability of killing or inactivating common biological warfare agents, fungus, spores, infectious agents, molds, yeast, yeast biofilms, pathogens, protists, prions, rickettsia, bacteria, virus, and other resistant biological contaminants. The biocide, viricide, fungicide, sporicide or biological warfare agent neutralizer may comprise sodium hypochlorite, potassium hypochlorite, pH-amended sodium hypochlorite, quaternary ammonium salts, quaternary ammonium chloride, quaternary ammonium bromide, didecyl ammonium chloride, didecyl dimethyl ammonium chloride, isothiazolin-benzalkonium chloride, sodium dichloroisocyanurate, pH-amended bleach (Clorox®), potassium permanganate, potassium peroxydisulfate, potassium peroxymonosulfate, potassium molybdate, hydrogen peroxide, chloroisocyanuric acid salt, oxidants, nucleophiles, hydroxide ions, catalytic enzymes, o-iodosobenzoate, iodoxybenzoate, sodium perborate, sodium percarbonate, peracetic acid, m-chloroperoxybenzoic acid, magnesium monoperoxyphthalate, benzoyl peroxide, hydroperoxy carbonate ions, polyoxymetalates, quaternary ammonium complexes, formaldehyde, glutaraldehyde, ortho-phthalaldehyde, phenol, cresol, triclosan, Sandia Foam (Sandia National Laboratories), Modec's Decon Formula (Modec, Inc.), or a mixture of two or more thereof. The chemical warfare agent neutralizers may comprise a lanthanide salt, a lanthanum salt, a samarium salt, lanthanum triflate, lanthanum mesolate, samarium triflate, samarium mesolate, 4,4'-dialkylaminopyridine or a 4,4'-dialkylaminopyridine containing compound, imidazole, methyl imidazole, benzyl imidazole, potassium permanganate, potassium peroxydisulfate, potassium peroxymonosulfate, potassium molybdate, hydrogen peroxide, chloroisocyanuric acid salt, sodium hypochlorite, potassium hypochlorite, pH-amended sodium hypochlorite, hydrogen peroxide, oxidants, nucleophiles, hydroxide ions, catalytic enzymes, organophosphorous acid anhydrolase, o-iodosobenzoate, iodoxybenzoate, sodium perborate, sodium percarbonate, peracetic acid, m-chloroperoxybenzoic acid, magnesium monoperoxyphthalate, benzoyl peroxide, hydroperoxy carbonate ions, polyoxymetalates, quaternary ammonium complexes, Sandia Foam (Sandia National Laboratories), EasyDECON™ 200 Decontamination Solution, Modec's Decon Formula (Modec, Inc.) or a mixture of two or more thereof. The humectant may comprise polyacrylic acid, polyacrylic acid salt, an acrylic acid copolymer, a polyacrylic acid salt copolymer, or a mixture of two or more thereof. The concentration of each of these in the polymer composition (before drying) may be up to about 25% by weight, or up to about 10% by weight.

The polymer composition may have a broad range of viscosities and rheological properties which allows the polymer composition to diffuse into the substrate (i.e., clean or contaminated substrate) for a relatively deep cleaning, allow for a variety of application methods including application via brush, roller or spray equipment, and to allow for a thick enough wet film on non-horizontal surfaces to result in a dry film with sufficient strength to allow for removal by peeling or stripping the film. The thixotropic agent may be used to control or enhance these rheological properties. The Brookfield Viscosity of the polymer composition may be in the range from about 100 to about 500,000 centipoise, and in one embodiment in the range from about 200 to about 200,000 centipoise measured at the rpm and spindle appropriate for the sample in the range of 0.3-60 rpm and spindles 1-4 at 25° C.

When the polymer composition is dehydrated and/or the polymer is cross-linked it may form a film, and the resulting film may encapsulate, entrap, solubilize and/or emulsify hydrophobic and/or hydrophilic materials, as well as neutralize chemical toxins, biological toxins, and the like. The sequestering agent may be used to adsorb, absorb, encapsulate and/or combine with metal ions, radiological isotopes, hydrophobic solvents, chemical warfare agents, biological warfare agents, toxic chemicals, dirt, spores, infectious agents, molds, yeast, yeast biofilms, pathogens, protists, prions, rickettsia, mixtures of two or more thereof, and the like. The chelating agent may be used to form complexes with contaminant materials such as metal ions and other charged particles (e.g., heavy metals, radioactive materials, and the like) wherein the resulting complex may be removed from the substrate with the polymer composition. The film may have a concentration of water in the range from about 30 to about 97% by weight, or from about 50 to about 95% by weight. As indicated above, this film may be referred to as a hydrogel, for example, a strippable or peelable hydrogel. The film may have a dry film thickness and tensile strength sufficient to allow it to be stripped or peeled from the substrate. The dry film thickness may be in the range from about 0.25 to about 500 mils, or from about 0.5 to about 100 mils, or from 0.5 to 50 mils. Upon separating (e.g., stripping, peeling, washing, etc.) the film from the substrate, the contaminants or contaminated material may be taken up with the film and thereby removed from the substrate.

The polymer composition may be applied to the substrate using a laminate structure. The laminate structure may comprise a layer of the film overlying part or all of one side of a release liner. Alternatively, the film layer may be positioned between two release liners. The film layer may be formed by coating one side of the release liner with the aqueous polymer composition using conventional techniques (e.g., brushing, roller coating, spraying, and the like) and then dehydrating the aqueous composition and/or cross-linking the polymer to form the film layer. If the laminate structure comprises a second release liner, the second release liner may then be placed over the film layer on the side opposite the first release liner. The film layer may have a thickness in the range from about 1 to about 500 mils, and in one embodiment from about 5 to about 100 mils. The release liner(s) may comprise a backing liner with a release coating layer applied to the backing liner. The release coating layer contacts the film layer and is provided to facilitate removal of the release liner from the film layer. The backing liner may be made of paper, cloth, polymer film, or a combination thereof. The release coating may comprise any release coating known in the art. These may include silicone release coatings such as polyorganosiloxanes including polydimethylsiloxanes. When the laminate structure comprises a release liner on one side of the film layer, the laminate structure may be provided in roll form. The film layer may be applied to a substrate by contacting the substrate with the film layer, and then removing the release liner from the film layer. The film layer may be sufficiently tacky to adhere to the substrate. When the laminate structure comprises a release liner on both sides of the film layer, the laminate structure may be provided in the form of flat sheets. The film layer may be applied to a substrate by peeling off one of the release liners from the laminate structure, contacting the substrate with the film layer, positioning the film layer on the substrate, and then removing the other release liner from the film layer.

The substrates that may be treated with the inventive polymer compositions may include human skin and wounds, as well as wood, metal, glass, concrete, painted surfaces, plastic surfaces, and the like. The substrate may comprise a porous or non-porous material. The substrate may comprise horizontally aligned non-porous substrates such as floors, counter tops, table tops, medical equipment, gurneys, heart stress test room surfaces, toilet seats, as well as complex three dimensional structures such as faucets, tools and other types of equipment or infrastructure and the like. The inventive polymer compositions may be used to decontaminate substrates containing bacteria, spores, fungi, viruses, mixtures of two or more thereof, and the like. The inventive polymer compositions may be used to decontaminate buildings, medical facilities and articles of manufacture, buildings and infrastructure intended for demolition, military assets, airplanes, as well as ship interiors and exteriors of military or civilian ships.

The inventive polymer composition may be used to remove radioactive contaminants that may be found in or on the exterior of submarines and aircraft carriers as a result of activities relating to the use of nuclear materials for propulsion and weaponry. The inventive polymer compositions may be used to decontaminate areas contaminated by spills of toxic chemicals such as wastes containing lead, cadmium, zinc, mercury, arsenic, and the like. The inventive polymer composition may be used to decontaminate areas contaminated with chemical warfare agents such as nerve agents (e.g., Tabun (ethyl-N,N-dimethyl phosphoramicocyanidate), Sarin (isopropyl methyl phosphorofluoridate), Soman (1-methyl-2:2-dimethyl propyl methyl phosphorofluoridate), and VX (ethyl S-2-diisopropylaminoethylmethyl phosphorothiolate)), and blistering agents (e.g., phosgene, mustard, and the like), as well as carcinogens, general poisons, and the like. The inventive polymer compositions may be used to decontaminate biological laboratories and military/government biological warfare research facilities from contamination ranging from the mundane, such as common bacterial and fungal contamination, to the extremely hazardous, such as anthrax spores, HIV and Ebola viruses. The inventive polymer composition may be used to remove hazardous waste materials from contaminated substrates. The inventive polymer composition may be used to decontaminate substrates containing radionuclides used in nuclear medicine. The inventive polymer can be used as a countermeasure to terrorist attacks to decontaminate urban infrastructure, military assets, etc. after the detonation of a radiological dispersal device (RDD) or similar device containing chemical or biological toxins or warfare agents. The inventive polymer composition may be used to decontaminate radioactive material in current and previous manufacturing settings for radiological, chemical and biological weaponry or other products.

The inventive polymer composition may comprise a rapidly deployable and low-cost chemical biological radionuclide (CBRN) decontamination product requiring minimal training for application and removal. The polymer composition may comprise one or more components that may be mixed with the remainder of the polymer composition just prior to application or mixed at the spray tip during a spray application. The polymer composition may be easily contained for disposal and as a result provide rapidly restored access to operations and minimize attack/incident effects on hard assets and infrastructure. The polymer composition may be used to penetrate 'nooks and crannies', encapsulate contaminants and dry to form a tough film, allowing for peel-off removal of radioactive contamination, chemical and biological agents, hydrophilic and hydrophobic compounds as well as undesirable particulate matter. The inventive polymer composition may be used to prevent airborne spread of contaminants, and eliminate or reduce the hazards and difficulty of controlling further spread of contamination and reduce or eliminate the need for conventional waste processing such as required with the use of detergent/bleach and rinse solutions. The inventive polymer composition may be used to decontaminate the interior and exterior of military assets, buildings and structural surfaces, manufacturing facilities, power plants, shipping and transportation hubs and related transit infrastructure, and the like.

The peelability or strippability of the film may be determined subjectively. The peelability or strippability from substrates such as tile, Formica, porcelain, chrome, stainless steel, glass, sealed grout, unsealed grout, rubber, leather, plastic, painted surfaces, concrete, wood, reactors, storage vessels, and the like, may be very good.

In the following examples, unless otherwise indicated, the abbreviation "g" refers to grams, the abbreviation "ml" refers to milliliters, and the abbreviation "$cm^2$" refers to square centimeters. Also, unless otherwise indicated, all pressures are atmospheric pressure, and all percentages and parts are by weight.

Example 1

A jacketed one-liter reactor equipped with a thermocouple, condenser and stir motor is charged with 642.2 grams of distilled water, 8.1 grams of Dissolvine DZ (a product by AkzoNobel Industrial Chemicals identified as diethylenetriaminepentaacetic acid (DTPA)), 28.2 grams of Stanfax 1025 (a product of ParaChem identified as 29.5% of sodium dodecyl sulfate (SDS)), 3.9 grams of 50% aqueous sodium hydroxide, 4.0 grams of BYK-028 (product of BYK Chemie identified as a mixture of foam destroying polysiloxanes and hydrophobic solids in polyglycol) and 4.3 grams of BYK-080 (product of BYK Chemie identified as foam destroying polysiloxane). The resulting aqueous composition is agitated until the salts are dissolved followed by the addition of 122.0 grams of Celvol 523 (a product of Celanese Corporation identified as polyvinyl alcohol). The mixture is heated to 85° C. and held for 30 minutes, then cooled to 70° C. The mixture is then cooled to 45° C. while adding 52.0 grams of ethanol to the mixture. 12.0 grams of BYK-420 (a product of BYK Chemie identified as a solution of modified urea described as being useful for providing thixotropic flow behavior and anti-sagging properties) are added drop wise to the mixture with stirring. The solution is agitated under high shear stirring at this temperature for 1 hour. 4.0 grams of BYK-345 (a product of BYK-Chemie identified as polyether modified siloxane described as being useful as a weting agent), 1 grams of Dowicil 75 (a product of Dow identified as a preservative), 0.006 grams of Spectrazurine Blue FGND-C LIQ (a product supplied by Spectra Color Corp. identified as a blue food coloring), and 62.0 grams of distilled water are added. The resulting polymer composition has a pH of 5.8. This polymer composition may be referred to as Formulation A.

Example 2

A 30-S type Attritor grinder is charged with 105 lbs of distilled water and 63 grams of TEGO Foamex 810 (a product of Evonik Tego Chemie GmbH identified as polyether siloxanes). 38.8 lbs of Formulation A are then added to the reaction mixture followed by the slow introduction of 66 lbs of chabazite fine powder provided by Zeox Corporation (Cortaro, Ariz.) until dispersed. The composition is milled for 60 minutes under high shear stirring to provide a chabazite paste which may be referred to as Formulation B. The targeted mean particle size is 10 μm, or 7 or higher in Hegman grind gage scale units. The paste is shear thinning and flows with agitation.

Example 3

15 g of Celvol 523 and 85 ml of water are added to a 250 ml beaker with stirring. The beaker is heated in a silicone oil bath having a temperature of 96° C. for two hours. The Celvol 523 dissolves in the water. The mixture is then cooled to room temperature. 1 g of Formulation B and 1.2 g of hydroxylethyl cellulose are added to the mixture under high shear stirring to provide an aqueous polymer composition. 100 ml of the polymer composition are applied to a surface area of 370 inches$^2$ (2387 cm$^2$) using a brush to provide a uniform coating. The coating is left on the substrate for 12 hours at a temperature of 25° C. Water evaporates from the polymer composition. The resulting film is peeled off and is suitable for disposal.

Example 4

15 g of Celvol 523 and 85 ml of water are added to a 250 ml beaker with stirring. The beaker is heated in a silicone oil bath having a temperature of 85° C. for two hours. The Celvol 523 dissolves in the water. The mixture is then cooled to room temperature. 1 g of Formulation B and 1.2 g of BYK 420 (a product of BYK-Chemie identified as a modified urea) are added to the mixture under high shear stirring to provide an aqueous polymer composition. This polymer composition may be referred to as an aqueous polymer composition. 100 ml of the polymer composition are applied to a surface area of 370 inches$^2$ (2387 cm$^2$) using a brush to provide a uniform coating. The coating is left on the substrate for 12 hours at a temperature of 25° C. Water evaporates from the polymer composition. The resulting film is peeled off and is suitable for disposal.

Example 5

10 g of Celvol 523 and 75 ml of water are added to a 250 ml beaker with stirring. The beaker is heated for two hours in a silicone oil bath which is at a temperature of 96° C. The Celvol 523 dissolves in the water. The mixture is then cooled to room temperature. 1 g of Formulation B and 2 g of hydroxylethyl cellulose are added to the mixture under high shear stirring to provide an aqueous polymer composition. 100 ml of the aqueous polymer composition are applied to a substrate having an area of 370 inches$^2$ (2387 cm$^2$) using a pump sprayer. The aqueous polymer composition is applied using two coats and allowed to dry for one hour between coats. The resulting coating is left on the substrate for an additional 12 hours at a temperature of 20° C. Water evaporates from the polymer composition. The resulting film is peeled off and is suitable for disposal.

Example 5 is repeated except that three coats of the polymer composition are applied to the substrate, and a drying time of two hours between coats is used.

Example 6

10 g of the Celvol 523 and 75 ml of water are added to a 250 ml beaker with stirring. The beaker is placed in a silicone oil bath for two hours. The silicone oil bath is at a temperature of 96° C. The Celvol 523 dissolves in the water. The mixture is then cooled to room temperature. 1 g of the Formulation B and 1.2 g of BYK 420 are added to the mixture under high shear stirring to provide an aqueous polymer composition. The aqueous polymer composition is applied to a substrate using a pump sprayer. The resulting coating is applied using two coats and allowed to dry for one hour between coats. The coating is left on the substrate for an additional 12 hours at 20° C. Water evaporates from the polymer composition. The resulting film is peeled off and is suitable for disposal.

Example 6 is repeated except that three coats of the polymer composition are applied to the substrate, and a drying time of two hours between coats is used.

Example 7

A jacketed one-liter reactor equipped with a thermocouple, condenser and stir motor is charged with 697.7 g of distilled water, 8.2 g of DTPA, 28.3 g of Stanfax 1025, 6.6 g of 10 N sodium hydroxide, 4.1 g of BYK 028, and 4.1 g of BYK 080. The resulting aqueous composition is agitated until the salts are dissolved followed by the addition of 125.0 g of Celvol 523. The mixture is heated to 85° C. and held at 85° C. for 30 minutes, then cooled to 65° C. 4.0 g of limonene are added to the reaction mixture under high shear agitation followed by the drop-wise addition of 9 g of BYK-420. The temperature is kept at 65° C. for 30 minutes, then cooled to room temperature. 4.1 g of BYK-345, 1 g of Formulation B and 1.6 g of Dowicil 75 are then added to the reactor followed by the addition of 106.6 g of water and 0.00066 g of blue dye food coloring. The formulation is dispersed for 30 more minutes to yield an aqueous polymer composition that may be referred to as Formulation C.

Example 8

Formulation C is tested for its Cesium-137 decontamination efficacy. Factors evaluated include concentration of contaminant (low and high amount of contaminant), type of substrate (steel and concrete), contamination type (CsCl and CsNO$_3$), contamination period (time between application of contaminant and application of gel ranging from 1 hr to 42 days) and decontamination time (time which the gel remains on the substrate ranging from 1 to 7 days). Decontamination of steel substrates averages 99.9+% for Formulation C. Decontamination efficacy (%) of Formulation C against cesium salts (both chlorides and nitrates) from concrete substrates averages 63% after 1 application and 73% after 2 applications. Tables 1 and 2 below summarize data for the evaluations on cesium decontamination using Formulation C from steel and concrete, respectively.

TABLE 1

Cesium decontamination (%) of Formulation C on stainless steel

| Run | Contamination period (days) | Initial (kcpm) | Final (kcpm) | Background Corrected (k cpm) | % Decontamination |
|---|---|---|---|---|---|
| 1 | 1 | 193 | 0.165 | 0.101 | 99.95% |
| 2 | 1 | 189 | 0.138 | 0.074 | 99.96% |
| 3 | 42 | 182.5 | 0.148 | 0.084 | 99.95% |
| 4 | 42 | 179.8 | 0.14 | 0.076 | 99.96% |

% Decontamination: (Initial challenge (cpm) − Remaining challenge (cpm))/Initial challenge × 100 (%). For these runs, $CsNO_3$ is applied on the steel coupons at a concentration of 1.5 µCi

TABLE 2

Decontamination efficacy of Formulation C on concrete substrates

| Contaminant type | Concentration (ppm) | Contamination period (days) | Decontamination (days) | % Decontamination $1^{st}$ appl | % Decontamination $2^{nd}$ appl | % Decontamination $3^{rd}$ appl |
|---|---|---|---|---|---|---|
| CsCl | 10000 | 42 | 7 | 36.6 | | |
| CsNO3 | 30 × 10−3 | 1 | 1 | 46.5 | 59.7 | |
| CsNO3 | 10000 | 0.042 | 1 | 67.13 | 77 | 85.5 |
| CsNO3 | 10000 | 1 | 7 | 60.9 | 77.5 | |
| CsNO3 | 30 × 10−3 | 42 | 7 | 20.3 | 35.6 | 50.6 |
| CsNO3 | 10000 | 0.042 | 7 | 81.7 | | |
| CsCl | 30 × 10−3 | 42 | 1 | 34.8 | | |
| CsCl | 30 × 10−3 | 0.042 | 1 | 66.3 | 77.1 | |

% Decontamination: Initial challenge (cpm) − Remaining challenge (cpm)/Initial challenge × 100 (%). The values provided above are averages for three individual runs.

Example 9

A jacketed six-liter reactor equipped with a thermocouple, condenser and stir motor is charged with 4740 g of distilled water, 50.1 g of DTPA, 84.0 g sodium dodecyl sulfate, 24.0 g of Triton X-100, 32.4 g of sodium hydroxide (50% wt in water), 18.6 g of TEGO Foamex 810, and 30.6 g of C-22977 (a product of New London Chemicals identified as a silicon-based emulsion). The resulting aqueous composition is agitated until the salts are dissolved, followed by the addition of 756 g of Celvol 523. The mixture is heated to 85° C. and held at 85° C. for 30 minutes, then cooled to 65° C. 57.0 g of ethanol (190 proof) and 12.0 g of limonene are added to the reaction mixture under high shear agitation using a Cowles Blade followed by the drop-wise addition of 37.5 g of BYK-420 and 37.5 g of BYK-D420. The rotation of the Cowles Blade is increased during addition to maintain a vortex. The temperature is maintained at 65° C. for 30 minutes, then cooled to room temperature. Under high agitation (1000 pm) 15.9 g of BYK-345, 90 g of formulation B (chabazite paste), 6 g of Kathon LX 1.5% and 0.37 g of Spectrazurine Blue FGND-C LIQ are added and the formulation is stirred for 60 more minutes at 1000 rpm. The formulation is stirred for an additional 15 minutes at 3000 rpm to yield a polymer composition that may be referred to as Formulation D.

Formulation D has a Brookfield Viscosity of 32,000 cps (3 rpm, spindle 4, 25° C.) and 9,790 cps (30 rpm, spindle 4, 25° C.).

Formulation D may be sprayed on to a substrate with an industrial-type sprayer able to deliver 0.95 gallons/minute at 3300 psi (for example ULTRA MAX II 695 airless sprayer, a product of GRACO, Inc.). The resulting film or coating may be applied using two or three coats and allowed to dry for one or two hours between coats. The coating may be left on the substrate for 12 hours at 20° C. Water evaporates from the polymer composition. The resulting film may be removed by peeling, washing, wiping, scrubbing, spraying and/or rinsing and is suitable for disposal. Formulation D may be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 10

Formulation D is evaluated for its performance in removing radioactive isotope americium (Am-243) from unpainted concrete. Prior to the evaluation, unpainted concrete coupons (15 cm by 15 cm) are contaminated with Am-243 at an activity level of 50 nanoCuries (nCi) Am-243, measured by gamma spectroscopy. Several of these contaminated coupons are placed in a vertical single coupon test stand. Two coats of formulation D are applied to the coupons in the test stand with a paint brush, allowed to dry overnight, and then removed. This procedure is performed twice and then the residual activity on the contaminated coupons is measured. The decontamination efficacy is determined for each contaminated coupon in terms of percent removal (% R) and a decontamination factor (DF) as defined by the following equations:

$$\% R = (1 - Af/Ao) \times 100\% \text{ and } DF = Ao/Af$$

where Ao is the radiological activity from the surface of the coupon before application of Formulation D, and Af is the radiological activity from the surface of the coupon after removal of the coating. Table 3 gives the % R and DF for Formulation D. Overall, formulation D decontaminated the concrete coupons with an average % R of 84%±5.7%.

TABLE 3

Decontamination efficacy of Formulation D on concrete substrates

| Decontamination Efficacy Results Coupon Position | Pre-Decorn Activity nCi/Coupon | Post-Decorn Activity nCi/Coupon | % R | DF |
|---|---|---|---|---|
| 1 | 48 | 6.9 | 86 | 7.0 |
| 2 | 52 | 7.4 | 86 | 7.1 |
| 3 | 53 | 6.1 | 89 | 8.8 |
| 4 | 58 | 6.8 | 88 | 8.4 |

TABLE 3-continued

Decontamination efficacy of Formulation D on concrete substrates

| Decontamination Efficacy Results Coupon Position | Pre-Decorn Activity nCi/Coupon | Post-Decorn Activity nCi/Coupon | % R | DF |
|---|---|---|---|---|
| 5 | 52 | 8.8 | 83 | 6.0 |
| 6 | 53 | 14 | 73 | 3.7 |
| Avg | 53 | 8.4 | 84 | 6.8 |
| SD | 3.1 | 3.0 | 5.7 | 1.8 |

Example 11

A jacketed six-liter reactor equipped with a thermocouple, condenser and stir motor is charged with 4921 g of distilled water, 34 g of Dissolvine DZ, 59 g of Stanfax 1025, 16 g of Triton X-100 (a product of Dow Chemical Company identified as a non-ionic surfactant), 18 g of 50% aqueous sodium hydroxide, 16.6 g of TEGO Foamex 810, and 16.9 g of C-22977. The resulting aqueous composition is agitated until the salts are dissolved followed by the addition of 492.4 g of Celvol 523. The mixture is heated to 85° C. and held at 85° C. for 30 minutes, then cooled to 65° C. 18.6 g of limonene and 57 g of ethyl alcohol (190 proof) are added to the reaction mixture under high agitation followed by the drop-wise addition of 74 g of BYK-420 and 74 g of BYK-D420. The temperature is maintained at 65° C. for 30 minutes, and then cooled to room temperature. 90 g of the Formulation B are then added to the reactor followed by the addition of 24.6 g of BYK-345. 6 g of Kathon LX 1.5% are then added to the reactor followed by the addition of 120 g of water and 0.37 g of blue dye food coloring. The formulation is stirred for 30 more minutes to yield a polymer composition that may be referred to as Formulation F. Formulation F has a Brookfield Viscosity of 4,000 cps (30 rpm, spindle 3, 25° C.) and 34,580 cps (3 rpm, spindle 3, 25° C.). The pH is 6.1.

Formulation F may be applied by brush, trowel or sprayed through an industrial sprayer. The resulting coating may be allowed to dry on the substrate for 12 hours at 20° C. Water evaporates from the polymer composition. The resulting film may be removed by peeling, washing, wiping, scrubbing, spraying and/or rinsing and is suitable for disposal. Formulation F can be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 12

Formulation F is evaluated for its ability to remove radioactive technetium-99 metastable (Tc-99m) from concrete wall and floor surfaces similar to those found regularly in homes and buildings. Formulation F is applied to four test areas, consisting of 20 square feet of wall surface and 33 square feet of floor surface with approximately 2 milliCuries (mCi) of acidic solutions of Tc-99m. The amount of contamination deposited on each grid square is measured using beta, gamma G-M, and sodium iodide (NaI) detectors connected to a Ludlum radiation ratemeter/scaler. The vertical and horizontal surfaces are decontaminated using Formulation F. Two coats of Formulation F are sprayed onto the vertical wall surface, and one coat is sprayed onto the floor surface areas. The second coat of Formulation F is applied to the wall surface approximately two hours after the initial coat in order to allow the first coat to partially dry. Approximately 20 hours after the second coat is applied, the dried Formulation F is peeled from the surfaces and the grids are resurveyed for contamination. Decontamination of the 20 square feet of the vertical surface area results in an average decontamination efficacy (% R) of approximately 71%. Decontamination of the 33 square feet of the floor surface area results in an average % R of approximately 80%. During this evaluation, Formulation F is sprayed utilizing a COTS (Commercial Off The Shelf) spray pump that can maintain a pressure of 3,300 pounds per square inch (psi) while maintaining an output rate exceeding 0.95 gallons/minute.

Example 13

A jacketed six-liter reactor equipped with a thermocouple, condenser and stir motor is charged with 4500 g of distilled water, 49.2 g of DTPA, 42.0 g, of Stanfax 1025, 24 g of Triton X-100 (a product of Dow Chemical Company identified as a non-ionic surfactant), 24 g of Ecosurf SA-7 (a product of Dow Chemical Company identified as a non-ionic surfactant), 60.6 g of 10 N sodium hydroxide, 24.6 g of TEGO Foamex 810, and 24.6 g of C-22977. The resulting aqueous composition is agitated until the salts are dissolved followed by the addition of 738.0 g of Celvol 523. The mixture is heated to 85° C. and held at 85° C. for 2 hrs, then cooled to 65° C. 3.0 g of limonene and 12 g of dipropylene glycol monomethyl ether are added to the reaction mixture under high agitation followed by the drop-wise addition of 30 g of BYK-D420 (a product of BYK Chemie identified as a modified urethane). The temperature is kept at 65° C. for 30 minutes and then cooled to room temperature. 18 g of Cellulose Wallocel VP 40000 (a product of Dow Chemical Company identified as a sodium carboxymethyl cellulose) is then added to the reactor followed by the addition of 90 g of Formulation B and 5.7 g of Kathon LX 1.5% (a product of Dow/Rohm and Haas identified as a microbiocide) are then added to the reactor followed by the addition of 239.7 g of water and 0.00066 g of blue dye food coloring. The formulation is stirred for 30 more minutes to yield an aqueous polymer composition that may be referred to as Formulation E. Formulation E has a Brookfield Viscosity of 13,000 cps (30 rpm, spindle 3, 25° C.) and 31,580 cps (3 rpm, spindle 3, 25° C.). The pH is 5.84.

Formulation E may be applied by brush, trowel or roller on a substrate. The resulting coating may be allowed to dry on the substrate for 12 hours at 20° C. Water evaporates from the polymer composition. The resulting film may be removed by peeling, washing, wiping, scrubbing, spraying and/or rinsing and is suitable for disposal. Formulation E can be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 14

Formulation E is evaluated for its performance in removing radioactive isotope cesium Cs-137 from concrete. Eight coupons are contaminated by spiking individually with 2.5 mL of an aqueous solution that contains 0.26 mg/L of Cs-137 as a solution of cesium chloride, corresponding to an activity level of approximately 1 µCi over a 225 cm² surface. Formulation E is applied onto the contaminated concrete coupons with a 4 inch (10.2 cm) paint brush. All coupons are oriented vertically. The time required to apply each coating to a coupon averages 30 seconds for each coat that is applied. Two coats are applied to each coupon and then the coupons are allowed to dry overnight and the coatings are removed. That cycle is repeated once.

The dry coatings are removed by first scoring the surface of the coupons (covered with dried coatings) into four sections with a utility knife and using the tip of the knife to free corners of the dried coating so they can be pulled off the surface by hand. The dry coatings are removed from each coupon over an average period of time of 1 minute, 24 seconds.

Gamma radiation from the surface of each concrete coupon is measured to quantify contamination levels both before and after application of Formulation E. These measurements were made using the Can berra intrinsic, high purity germanium detector referred to above. After being placed in the detector, each coupon is measured until the average activity level of Cs-137 from the surface stabilizes to a relative standard deviation of less than 2%. Table 4 below gives the % R and DF for Formulation E.

TABLE 4

Decontamination efficacy results of Formulation E{TC "Table 5-2. Decontamination Efficacy Results for DG-1108" \f T \l "1"}

| Coupon Location in Test Stand | Pre-Decontamination Activity (µCi/Coupon) | Post-Decontamination Activity (µCi/Coupon) | % R | DF |
|---|---|---|---|---|
| Top right | 1.07 | 0.28 | 74% | 3.8 |
| Center middle | 1.09 | 0.27 | 75% | 4.0 |
| Center right | 1.04 | 0.45 | 57% | 2.3 |
| Bottom right | 1.08 | 0.42 | 61% | 2.6 |
| Average | 1.07 | 0.36 | 67% | 3.2 |
| Std. Dev | 0.022 | 0.09 | 9% | 0.87 |

For comparison, Formulation A, a formulation that does not contain a solid particulate sequestering agent (chabazite), decontaminates the concrete in a similar set of runs by an average % R of 45±7% and an average DF of 1.9±0.24. This demonstrates the advantage of employing the solid particulate sequestering agent for removing contaminants from a surface.

Example 15

A jacketed six-liter reactor equipped with a thermocouple, condenser and stir motor is charged with 4559 g of distilled water, 50.16 g of Dissolvine DZ, 84 g of Stanfax 1025, 24 g of Triton X-100 (a product of Dow Chemical Company identified as a non-ionic surfactant), 32.33 g of 50% aqueous sodium hydroxide, 18.6 g of TEGO Foamex 810, and 30.6 g of C-22977. The resulting aqueous composition is agitated until the salts are dissolved followed by the addition of 756.0 g of Celvol 523. The mixture is heated to 85° C. and held at 85° C. for 30 minutes, then cooled to 65° C. 12 g of limonene and 57 g of ethyl alcohol (190 proof) are added to the reaction mixture under high agitation followed by the drop-wise addition of 37.5 g of BYK-420 and 37.5 g of BYK-D420. The temperature is kept at 65° C. for 30 minutes, and then cooled to room temperature. 90 g of Formulation B are then added to the reactor followed by the addition of 24.6 g of BYK-345. 6 g of Kathon LX 1.5% are then added to the reactor followed by the addition of 180 g of water and 0.00066 g of blue dye food coloring. The formulation is stirred for 30 more minutes to yield an aqueous polymer composition that may be referred to as Formulation F. Formulation F has a Brookfield Viscosity of 14,000 cps (30 rpm, spindle 3, 25° C.) and 34,580 cps (3 rpm, spindle 3, 25° C.). The pH is 5.7.

Formulation F may be applied by brush, trowel or roller on a substrate. The resulting coating may be allowed to dry on the substrate for 12 hours at 20° C. Water evaporates from the polymer composition. The resulting film may be removed by peeling, washing, wiping, scrubbing, spraying and/or rinsing and is suitable for disposal. Formulation F can be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 16

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 2.8 g of TEGO Foamex 810, and 5.4 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. 3 g of limonene are added to the reaction mixture under high shear agitation followed by the drop-wise addition of 9 g of BYK-420 and 3 g of polyacrylic acid (provided by Sigma Aldrich) with an average molecular weight ($M_w$) of 1,250,000. The temperature is kept at 65° C. for 30 minutes, and then cooled to room temperature. 1.5 g of Formulation B are then added to the reactor followed by the addition of 4.1 g of BYK-345. 1 g of Kathon LX 1.5% is then added to the reactor followed by the addition of 180 g of water and 0.00066 g of blue dye food coloring. The formulation is stirred for 30 more minutes to yield an aqueous polymer composition that may be referred to as Formulation G. Formulation G has a Brookfield Viscosity of 13,000 cps (30 rpm, spindle 3, 25° C.) and 29,580 cps (3 rpm, spindle 3, 25° C.). The pH is 5.6.

Example 17

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. 3 g of limonene are added to the reaction mixture under high shear agitation followed by the addition of 2 g of dipropylene glycol monomethyl ether. 4 g of Wallocel VP 40000 (a product of Dow Chemical Company identified as a sodium carboxymethyl cellulose) is then added to the reaction mixture followed by the drop-wise addition of 9 g of BYK-420. The temperature is kept at 65° C. for 30 minutes and then the reaction is cooled to room temperature. 2 g of Formulation B are then added to the reactor followed by the addition of 4.1 g of BYK-345. 1 g of Kathon LX 1.5% is then added to the reactor, followed by the addition of 26 g of water and 0.00066 g of blue dye food coloring. The formulation is stirred for 30 more minutes to yield an aqueous polymer composition that may be referred to as Formulation H. Formulation H has a Brookfield Viscosity of 12,000 cps (30 rpm, spindle 3, 25° C.) and 28,580 cps (3 rpm, spindle 3, 25° C.). The pH is 5.6.

Example 18

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. 3 g of limonene are added to the reaction mixture under high shear agitation followed by the drop-wise addition of 9 g of BYK-420 and 3 g of polyacrylic acid. The temperature is kept at 65° C. for 30 minutes and then the reaction is cooled to room temperature. 3 g of AMBERLITE™ IRC76 (a product of Purolite Company identified as an ion exchange resin that has been ground in-house with a high speed cowel blade and mill balls) is then added to the reactor followed by the addition of 4.1 g of BYK-345. 1 g of Kathon LX 1.5%, 26 g of water and 0.00066 g of blue dye food coloring are then added. The formulation is stirred for 30 more minutes to yield an aqueous polymer composition that may be referred to as Formulation I. Formulation I has a Brookfield Viscosity of 13,000 cps (30 rpm, spindle 3, 25° C.) and 31,000 cps (3 rpm, spindle 3, 25° C.). The pH is 5.6.

Example 19

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. 3 g of limonene are added to the reaction mixture under high shear agitation followed by the drop-wise addition of 9 g of BYK-420 and 3 g of polyacrylic acid. The temperature is kept at 65° C. for 30 minutes and then the reaction is cooled to room temperature. 2 g of Formulation B are then added to the reactor followed by the addition of 4.1 g of BYK-345. 1 g of Kathon LX 1.5% is then added to the reactor followed by the addition of 26 g of water and 0.00016 g of Prussian blue $(Fe_7(CN)_{18} \cdot 14H_2O)$. The formulation is stirred for 30 more minutes to yield an aqueous polymer composition that may be referred to as Formulation J. Formulation J has a Brookfield Viscosity of 13,000 cps (30 rpm, spindle 3, 25° C.) and 32,000 cps (3 rpm, spindle 3, 25° C.). The pH is 5.5.

Example 20

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. followed by the drop-wise addition of 12 g of BYK-420. The temperature is kept at 65° C. for 30 minutes and then the reaction is cooled to room temperature. 3 g of clinoptilolite (a zeolite with the general formula (Na, K, Ca)$_{2-3}$Al$_3$(Al,Si)$_2$Si$_{13}$O$_{36}$·12(H$_2$O)) is then added to the reactor followed by the addition of 4.1 g of BYK-345. 1 g of Kathon LX 1.5% is then added to the reactor followed by the addition of 26 g of water and 0.00016 g of Prussian blue $(Fe_7(CN)_{18} \cdot 14H_2O)$. The formulation is stirred for 30 more minutes to yield an aqueous polymer composition that may be referred to as Formulation K. Formulation K has a Brookfield Viscosity of 11,000 cps (30 rpm, spindle 3, 25° C.) and 26,000 cps (3 rpm, spindle 3, 25° C.). The pH is 5.5.

Example 21

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. 3 g of limonene are added to the reaction mixture under high agitation followed by the drop-wise addition of 12 g of BYK-420 and 3 g of polyacrylic acid fine powder. The temperature is kept at 65° C. for 30 minutes and then the reaction is cooled to room temperature. 3 g of AMBERJET™ UP 4000 (a product by Dow identified as a strongly basic anion exchange) is then added to the reactor followed by the addition of 4.1 g of BYK-345. 1 g of Kathon LX 1.5% is then added to the reactor followed by the addition of 26 g of water and 0.00016 g of Prussian blue $(Fe_7(CN)_{18} \cdot 14H_2O)$. The formulation is stirred for 30 more minutes to yield an aqueous polymer composition that may be referred to as Formulation L.

Example 22

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. 3 g of limonene are added to the reaction mixture under high shear agitation followed by the drop-wise addition of 12 g of BYK-420. The temperature is kept at 65° C. for 30 minutes and then the reaction is cooled to room temperature. 3 g of SIR-600 (a product by Resin-Tech identified as an ion exchange resin) is then added to the reactor followed by the addition of 4.1 g of BYK-345. 1 g of Kathon LX 1.5% is then added to the reactor followed by the addition of 26 g of water and 0.00016 g of Prussian blue $(Fe_7(CN)_{18} \cdot 14H_2O)$. The formulation is stirred for 30 more minutes to yield an aqueous polymer composition that may be referred to as Formulation M.

Example 23

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 125.0 g of Celvol 523. The mixture is heated to 85° C. and held at 85° C. for 30 minutes, then cooled to 65° C. 3 g of limonene are added to the reaction mixture under high agitation followed by the drop-wise addition of 12 g of BYK-420. The temperature is kept at 65° C. for 30 minutes and then the reaction is cooled to room temperature. 3 g of Dowex G-26 (a product by Dow identified as a strong acid cation exchange resin) is then added to the reactor followed by the addition of 4.1 g of BYK-345. 1 g of Kathon LX 1.5% is then added to the reactor followed by the addition of 26 g of water and 0.00016 g of Prussian blue (Fe7(CN)18.14H$_2$O). The formulation is stirred for 30 more minutes to yield an aqueous polymer composition that may be referred to as Formulation N.

Example 24

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the slow addition of 97 g of Natrosol 250HHR PA (a product by Hercules identified as a hydroxyethylcellulose). The mixture is mixed at high rpm for 120 minutes. The reaction mixture is then heated to 65° C. and kept there for the addition of 3 g of limonene under high shear agitation followed by the drop-wise addition of 12 g of BYK-420. The temperature is kept at 65° C. for 30 minutes and then the reaction is cooled to room temperature. 1.5 g of Formulation B are then added to the reactor followed by the addition of 4.1 g of BYK-345. 1 g of Kathon LX 1.5% is then added to the reactor followed by the addition of 26 g of water and 0.000016 g of blue food coloring dye. The formulation is stirred for 30 more minutes to yield an aqueous polymer composition that may be referred to as Formulation O.

Example 25

A jacketed one-liter reactor equipped with a thermocouple, condenser and stir motor is charged with 765 g of distilled water, 8.4 g of DTPA, 14 g of Stanfax 1025, 4 g of Triton X-100, 10.1 g of 10N aqueous sodium hydroxide, 4.1 g of TEGO Foamex 810, and 4.1 g of C-22977. The resulting aqueous composition is agitated until the salts are dissolved followed by the addition of 80.0 g of Celvol 523. The mixture is heated to 85° C. and held at 85° C. for 30 minutes, then cooled to 65° C. followed by the slow addition of 50 g of Natrosol 250HHR PA. 3 g of limonene are added to the reaction mixture under high agitation followed by the drop-wise addition of 12 g of BYK-420 under strong agitation. The temperature is kept at 65° C. for 30 minutes and then the reaction is cooled to room temperature. 2 g of Formulation B are then added to the reactor followed by the addition of 4.1 g of BYK-345.1 g of Kathon LX 1.5% is then added to the reactor followed by the addition of 26 g of water and 0.000016 g of blue food coloring dye. The formulation is stirred for 30 more minutes to yield an aqueous polymer composition that may be referred to as Formulation P.

Example 26

A jacketed six-liter reactor equipped with a thermocouple, condenser and stir motor is charged with 4559 g of distilled water, 50.16 g of Dissolvine DZ, 37 g of cetyltrimethylammonium bromide, 24 g of Triton X-100, 32.33 g of 50% aqueous sodium hydroxide, 18.6 g of TEGO Foamex 810, and 30.6 g of C-22977. The resulting aqueous composition is agitated until the salts are dissolved followed by the addition of 756.0 g of Celvol 523. The mixture is heated to 85° C. and held at 85° C. for 30 minutes, then cooled to 65° C. 12 g of limonene and 57 g of ethyl alcohol (190 proof) are added to the reaction mixture under high agitation followed by the drop-wise addition of 37.5 g of BYK-420 and 37.5 g of BYK-D420. The temperature is kept at 65° C. for 30 minutes, and then cooled to room temperature. 90 g of the Formulation B are then added to the reactor followed by the addition of 24.6 g of BYK-345. 6 g of Kathon LX 1.5% are then added to the reactor followed by the addition of 180 g of water and 0.00066 g of blue dye food coloring. The formulation is stirred for 30 more minutes to yield an aqueous polymer composition that may be referred to as Formulation R. Formulation R has a Brookfield Viscosity of 14,000 cps (30 rpm, spindle 3, 25° C.) and 34,580 cps (3 rpm, spindle 3, 25° C.). The pH is 5.7.

Formulation R may be applied by brush, trowel or roller on a substrate. The resulting coating may be allowed to dry on the substrate for 12 hours at 20° C. Water evaporates from the polymer composition. The resulting film may be removed by peeling, washing, wiping, scrubbing, spraying and/or rinsing and is suitable for disposal. Formulation R can be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 27

A jacketed six-liter reactor equipped with a thermocouple, condenser and stir motor is charged with 4559 g of distilled water, 50.16 g of Dissolvine DZ, 37 g of cetyltrimethylammonium bromide, 24 g of Triton X-100, 32.33 g of 50% aqueous sodium hydroxide, 18.6 g of TEGO Foamex 810, and 30.6 g of C-22977. The resulting aqueous composition is agitated until the salts are dissolved followed by the addition of 756.0 g of Celvol 523. The mixture is heated to 85° C. and held at 85° C. for 30 minutes, then cooled to 65° C. 12 g of limonene and 57 g of ethyl alcohol (190 proof) are added to the reaction mixture under high agitation followed by the drop-wise addition of 37.5 g of BYK-420 and 37.5 g of BYK-D420. The temperature is kept at 65° C. for 30 minutes, and then cooled to room temperature. 90 g of the Formulation B are then added to the reactor followed by the addition of 24.6 g of BYK-345. 6 g of Kathon LX 1.5% are then added to the reactor followed by the addition of 180 g of water and 0.06 g of Prussian Blue. The formulation is stirred for 30 more minutes to yield an aqueous polymer composition that may be referred to as Formulation S. Formulation S has a Brookfield Viscosity of 14,000 cps (30 rpm, spindle 3, 25° C.) and 34,580 cps (3 rpm, spindle 3, 25° C.). The pH is 5.7.

Formulation S may be applied by brush, trowel or roller on a substrate. The resulting coating may be allowed to dry on the substrate for 12 hours at 20° C. Water evaporates from the polymer composition. The resulting film may be removed by peeling, washing, wiping, scrubbing, spraying and/or rinsing and is suitable for disposal. Formulation S can be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 28

A jacketed six-liter reactor equipped with a thermocouple, condenser and stir motor is charged with 4559 g of distilled water, 50.16 g of Dissolvine DZ, 37 g of cetyltrimethylammonium bromide, 24 g of Triton X-100, 32.33 g of 50% aqueous sodium hydroxide, 18.6 g of TEGO Foamex 810, and 30.6 g of C-22977. The resulting aqueous composition is agitated until the salts are dissolved followed by the addition of 756.0 g of Celvol 523. The mixture is heated to 85° C. and held at 85° C. for 30 minutes, then cooled to 65° C. 12 g of limonene and 57 g of ethyl alcohol (190 proof) are added to the reaction mixture under high agitation followed by the drop-wise addition of 37.5 g of BYK-420 and 37.5 g of BYK-D420. The temperature is kept at 65° C. for 30 minutes, and then cooled to room temperature. 90 g of the Formulation B are then added to the reactor followed by the addition of 24.6 g of BYK-345. 6 g of Kathon LX 1.5% are then added to the reactor followed by the addition of 180 g of water, 30 g of glycerol and 0.06 g of Prussian Blue. The formulation is stirred for 30 more minutes to yield an aqueous polymer composition that may be referred to as Formulation T. Formulation T has a Brookfield Viscosity of 14,000 cps (30 rpm, spindle 3, 25° C.) and 34,580 cps (3 rpm, spindle 3, 25° C.). The pH is 5.7.

Formulation T may be applied by brush, trowel or roller on a substrate. The resulting coating may be allowed to dry on the substrate for 12 hours at 20° C. Water evaporates from the polymer composition. The resulting film may be removed by peeling, washing, wiping, scrubbing, spraying and/or rinsing and is suitable for disposal. Formulation T can be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 29

A jacketed six-liter reactor equipped with a thermocouple, condenser and stir motor is charged with 4900 g of distilled water, 34.0 g of DTPA, 60.0 g sodium dodecyl sulfate, 22 g of 10 N sodium hydroxide, 18.6 g of TEGO Foamex 810, and 17 g of C-22977 (a product of New London Chemicals identified as a silicon-based emulsion). The resulting aqueous composition is agitated until the salts are dissolved, followed by the addition of 500 g of Celvol 523. The mixture is heated to 85° C. and held at 85° C. for 30 minutes, then cooled to 65° C. This formulation is agitated using a Melton CM-100 disperser equipped with 1.5 inch (3.8 mm) Cowels Blade operated at a rate of 1000-3000 rpm. 15.9 g of BYK-345 are added, followed by the drop-wise addition of 129 g of BYK-420 over a period of approximately 10 minutes at 65° C. The rotation of the Cowles Blade is increased during addition to maintain a vortex. After the addition is complete, the formulation is stirred for 45 minutes at 3000 rpm at room temperature. The formulation is then stirred for 15 minutes at 3000 rpm followed by the addition of 20 g of fine chabazite powder, 2.1 blue food color dye and 120 g of distilled water. The formulation is stirred for an additional 15 minutes at 3000 rpm to yield a polymer composition that may be referred to as Formulation U. Formulation U has a Brookfield Viscosity of 32,000 cps (3 rpm, spindle 4, 25° C.) and 6,790 cps (30 rpm, spindle 4, 25° C.).

Formulation U may be sprayed on to a substrate with an industrial-type sprayer able to deliver 0.95 gallons/minute at 3300 psi (for example ULTRA MAX II 695 airless sprayer, a product of GRACO, Inc.). The resulting coating may be applied using two or three coats and allowed to dry for one or two hours between coats. The coating may be left on the substrate for 12 hours at 20° C. Water evaporates from the polymer composition. The resulting film may be removed by peeling, washing, wiping, scrubbing, spraying and/or rinsing and is suitable for disposal. Formulation U may be used to decontaminate vehicles, equipment, walls, floors, furniture, tools as well as a variety of surfaces that have been contaminated with toxic chemicals, hazardous chemicals, radioisotopes, radiological contaminants, heavy metals, and the like.

Example 30

A jacketed six-liter reactor equipped with a thermocouple, condenser and stir motor is charged with 3111 g of distilled water, 50.2 g of DTPA, 84.0 g sodium dodecyl sulfate, 24.0 g of Triton X-100, 32.4 g of sodium hydroxide (50% wt in water), 18.6 g of TEGO Foamex 810, and 30.6 g of C-22977. The resulting aqueous composition is agitated until the salts are dissolved, followed by the addition of 756 g of Celvol 523. The mixture is heated to 85° C. and held at 85° C. for 30 minutes, then cooled to 65° C. 1675.0 g of ethanol (190 proof) and 12.0 g of limonene are added to the reaction mixture under high shear agitation followed by the drop-wise addition of 37.5 g of BYK-420 and 37.5 g of BYK-D420. The rotation of the Cowles Blade is increased during addition to maintain a vortex. The temperature is kept at 65° C. for 30 minutes, then cooled to room temperature. Under high agitation (1000 rpm) 24.6 g of BYK-345, 90 g of Formulation B (chabazite paste), 6 g of Kathon LX 1.5% and 0.37 g of Spectrazurine Blue FGND-C LIQ are added and the formulation is stirred for 60 more minutes at 1000 rpm. The formulation is stirred for an additional 15 minutes at 3000 rpm to yield a polymer composition that may be referred to as Formulation V. Formulation V has a Brookfield Viscosity of 32,000 cps (3 rpm, spindle 4, 25° C.) and 9,790 cps (30 rpm, spindle 4, 25° C.).

Example 31

A jacketed six-liter reactor equipped with a thermocouple, condenser and stir motor is charged with 4559 g of distilled water, 50.16 g of Dissolvine DZ, 28.2 grams of Stanfax 1025, 24 g of Triton X-100, 32.33 g of 50% aqueous sodium hydroxide, 18.6 g of TEGO Foamex 810, and 30.6 g of C-22977. The resulting aqueous composition is agitated until the salts are dissolved followed by the addition of 756.0 g of Celvol 523. The mixture is heated to 85° C. and held at 85° C. for 30 minutes, then cooled to 65° C. 12 g of limonene and 57 g of ethyl alcohol (190 proof) are added to the reaction mixture under high agitation followed by the drop-wise addition of 37.5 g of BYK-420 and 37.5 g of BYK-D420. The temperature is kept at 65° C. for 30 minutes, and then cooled to room temperature. 90 g of the Formulation B are then added to the reactor followed by the addition of 24.6 g of BYK-345. 6 g of Kathon LX 1.5% are then added to the reactor followed by the addition of 180 g of water, 30 g of glycerol and 0.06 g of Prussian Blue. The formulation is stirred for 30 more minutes to yield an aqueous polymer composition that may be referred to as Formulation W. Formulation W has a Brookfield Viscosity of 14,000 cps (30 rpm, spindle 3, 25° C.) and 34,580 cps (3 rpm, spindle 3, 25° C.). The pH is 5.7.

Formulation W may be applied by brush, trowel or roller on a substrate. The resulting coating may be allowed to dry on the substrate for 12 hours at 20° C. Water evaporates from the polymer composition. The resulting film may be removed by peeling, washing, wiping, scrubbing, spraying and/or rinsing and is suitable for disposal. Formulation W can be used to decontaminate vehicles, equipment, walls, floors, furniture, tools as well as a variety of surfaces that have been contaminated with toxic chemicals, hazardous chemicals, radioisotopes, radiological contaminants, heavy metals, and the like The polymer composition of the invention may be applied to skin for use as a decontamination paste followed by removal by peeling, washing, wiping, scrubbing and/or rinsing.

The polymer composition may be applied to a contaminated substrate or surface and upon dehydration and/or cross-linking, the polymer composition may form a peelable or strippable film capable of decontaminating, cleaning and/or washing the substrate. The contaminants that may be so treated may include radionuclides, bacteria, viruses, fungi, chemical and/or biological warfare agents, heavy metals, toxic chemicals, dirt, oil, grease, and the like.

The polymer composition may be used as a sacrificial barrier to protect substrates from a wide variety of contaminants, including graffiti, as well as radioactive contaminants, dust, oil, grease, paint, and the like.

The polymer composition may be used as a fixative to prevent spreading of contaminants such as dirt, dust, radioactive isotopes, toxic chemicals, bacteria, viruses, fungi, spores, infectious agents, molds, yeast, yeast biofilms, pathogens, protists, prions, rickettsia, chemical warfare agents, biological warfare agents, and the like. If required, the fixative may be removed by applying a second coating of the polymer composition on top of the original coating which upon dehydration and/or cross-linking may be peeled off and disposed.

While the invention has been explained in relation to various embodiments, it is to be understood that various modifications thereof may become more apparent to those skilled in the art upon reading this specification. Therefore, it is to be understood that the invention includes all such modifications that may fall within the scope of the appended claims.

The invention claimed is:

1. A polymer composition, comprising: water; a water-soluble polymer; solid particulates of a sequestering agent, the sequestering agent comprising chabazite, clinoptilolite, or a mixture thereof, the particle size of the sequestering agent being sufficient to provide a Hegman grind gauge seal reading of about 7 or higher; and an effective amount of a thixotropic agent to allow the composition to flow freely when stirred and to thicken and resist sagging when applied to a non-horizontal substrate.

2. The composition of claim 1 wherein the composition further comprises a surfactant, a wetting agent, a chelating agent, a water-soluble sequestering agent, or a mixture of two or more thereof.

3. The composition of claim 1 wherein the composition further comprises a biocide, chemical neutralizer, defoamer, or a mixture of two or more thereof.

4. The composition of claim 1 wherein the composition further comprises one or more pseudoplastic additives, rheology modifiers, anti-settling agents, leveling agents, pigments, dyes, plasticizers, viscosity stabilizers, sporicides, viricides, fungicides, biocides, chemical warfare agent neutralizers, biological warfare agent neutralizers, cross-linkers, humectants, neutron absorbers, catalysts, soaps, detergents, or a mixture of two or more thereof.

5. The composition of claim 1 wherein the composition has a pH in the range from about 3 to about 9.

6. The composition of claim 1 wherein the polymer is biodegradable.

7. The composition of claim 1 wherein the polymer comprises a hydrophobic backbone and hydroxyl groups.

8. The composition of claim 1 wherein the polymer comprises hydrophobic blocks and hydrophilic blocks.

9. The composition of claim 1 wherein the polymer comprises vinyl alcohol repeating units.

10. The composition of claim 1 wherein the polymer comprises polyvinyl alcohol, a copolymer of vinyl alcohol, or a mixture thereof.

11. The composition of claim 1 wherein the polymer comprises repeating units represented by the formula —$CH_2$—CH(OH)— and repeating units represented by the formula —CH2-CH(OCOR)— wherein R is an alkyl group.

12. The composition of claim 1 wherein the polymer comprises vinyl alcohol repeating units and optionally vinyl acetate repeating units, the concentration of vinyl alcohol repeating units being from about 50 to about 100 mole %, the concentration of vinyl acetate repeating units being from 0 to about 50 mole %.

13. The composition of claim 1 wherein the polymer comprises a copolymer containing vinyl alcohol and/or vinyl acetate repeating units and repeating units derived from one or more of ethylene, propylene, acrylic acid, methacrylic acid, acrylamide, methacrylamide, dimethacrylamide, hydroxyethylmethacrylate, methyl methacrylate, methyl acrylate, ethyl acrylate, vinyl pyrrolidone, hydroxyethylacrylate, allyl alcohol, or a mixture of two or more thereof.

14. The composition of claim 1 wherein the polymer comprises one or more polysaccharides.

15. The composition of claim 14 wherein the polymer comprises one or more of carboxymethylcellulose, cellulose acetate, cellulose acetate butyrate, cellulose nitrate, ethylcellulose, hydroxyalkylcellulose, hydroxyalkylalkylcellulose, methylcellulose, starch, starch acetate, starch 1-octenylsuccinate, starch phosphate, starch succinate, hydroxyethylstarch, hydroxypropylstarch, cationic starch, oxidized starch, dextrin, or a mixture of two or more thereof.

16. The composition of claim 1 wherein the concentration of the sequestering agent in the polymer composition is in the range from about 0.1% to about 20% by weight.

17. The composition of claim 1 wherein the thixotropic agent comprises fumed silica, treated fumed silica, clay, hectorite clay, organically modified hectorite clay, a thixotropic polymer, a pseudoplastic polymer, polyurethane, polyhydroxycarboxylic acid amide, modified urea, urea modified polyurethane, polyacrylic acid, carboxymethylcellulose, a cellulose derivative, cellulose acetate, cellulose acetate butyrate, cellulose nitrate, ethylcellulose, hydroxyalkylcellulose, methylcellulose, chitosan, hyaluronic acid, starch, starch acetate, starch 1-octenylsuccinate, starch phosphate, starch succinate, hydroxyethylstarch, hydroxypropylstarch, cationic starch, oxidized starch, dextrin, or a mixture of two or more thereof.

18. The composition of claim 1 wherein the composition further comprises a co-solvent.

19. The composition of claim 18 wherein the co-solvent comprises one or more alcohols, ketones, polar organic solvents, acetates, chlorinated solvents, ethers, or a mixture of two or more thereof.

20. The composition of claim 18 wherein the co-solvent comprises methanol, ethanol, propanol, butanol, cyclohexanol, amyl alcohol, methyl amyl alcohol, glycerol, acetone, methyl ethyl ketone, methyl isobutyl ketone, cyclohexanone, pentane, hexane, benzene, toluene, xylene, methyl acetate, ethyl acetate, propyl acetate, n-butyl acetate, carbon tetrachloride, chloroform, trichloroethylene, methylene chloride, diethyl ether, methyl ethyl ether, ethylene glycol monobutyl ether, ethylene glycol monoethyl ether, n-propyl bromide, propylene carbonate, ethyl lactate, monoethanolamine, diethanolamine, dimethylsulfoxide, methyl pyrollidone, ethyl pyrollidone, dimethylformamide, acetonitrile, limonene, tetrahydrofuran, or a mixture of two or more thereof.

21. The composition of claim 18 wherein the concentration of the co-solvent in the polymer composition is in the range from about 0.1 to about 80% by weight.

22. The composition of claim 18 wherein the co-solvent comprises ethanol, methanol, isopropanol or a mixture of two or more thereof, and the concentration of the co-solvent in the polymer composition is in the range from about 25% to about 40% by weight.

23. The composition of claim 18 wherein the co-solvent comprises ethanol and the concentration of the co-solvent in the polymer composition is in the range from about of 0.5% to about 1.5% by weight.

24. The composition of claim 18 wherein the co-solvent comprises isopropanol and the concentration of the co-solvent in the polymer composition is in the range from about 0.5% to about 2% by weight.

25. The composition of claim 1 wherein the composition further comprises a humectant.

26. The composition of claim 25 wherein the humectant comprises polyacrylic acid, sodium hyaluronate, methyl propanediol, glycerol, propylene glycol, glyceryl triacetate, a sugar polyol, sorbitol, xylitol, maltitol, a polymeric polyol, polydextrose, a natural extract *quillaia*, lactic acid, urea, carboxymethylcellulose, hydroxyethyl cellulose, chitosan, or a mixture of two or more thereof.

27. The composition of claim 1 wherein the composition further comprises a chelating agent.

28. The composition of claim 27 wherein the chelating agent comprises an organic compound that contains a hydrocarbon linkage and two or more functional groups, the functional groups comprising one or more of =X, —XR, —NR$_2$, —NO$_2$=NR, =NXR, =N—R*—XR,

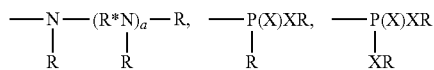

herein: X is O or S; R is H or alkyl; R* is alkylene; and a is a number ranging from zero to about 10.

29. The composition of claim 27 wherein the chelating agent comprises ethylenediaminetetraacetic acid, diethylenetriaminepentaacetic acid, citric acid, peptide, amino acid, aminopolycarboxylic acid, gluconic acid, glucoheptonic acid, organophosphonate, bisphosphonate, inorganic polyphosphate, or a mixture of two or more thereof.

30. The composition of claim 2 wherein the surfactant and/or wetting agent comprises one or more alkanolamines, alkylarylsulfonates, amine oxides, poly(oxyalkylene) compounds, block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, fatty acid amides, glycerol esters, glycol esters, sorbitan esters, imidazoline derivatives, lecithin and derivatives, lignin and derivatives, monoglycerides and derivatives, olefin sulfonates, phosphate esters and derivatives, propoxylated and ethoxylated fatty acids or alcohols or alkyl phenols, sorbitan derivatives, sucrose esters and derivatives, sulfates or alcohols or ethoxylated alcohols or fatty esters, sulfonates of dodecyl and tridecyl benzenes or condensed naphthalenes or petroleum, sulfosuccinates and derivatives, tridecyl or dodecyl benzene sulfonic acid, polysiloxane, dimethylpolysiloxane, polyether modified dimethylpolysiloxane, polyester modified dimethylpolysiloxane, polymethylalkylsiloxane, aralkyl modified polymethylalkylsiloxane, alcohol alkoxylates, polyacrylates, polymeric fluorosurfactants, fluoro modified polyacrylates, or a mixture of two or more thereof.

31. The composition of claim 2 wherein the surfactant and/or wetting agent comprises sodium lauryl sulfonate, cetyltrimethyl ammonium bromide, or a mixture thereof.

32. The composition of claim 1 wherein the composition comprises a chemical warfare agent neutralizer, the chemical warfare agent neutralizer comprising a lanthanide salt, a lanthanum salt, a samarium salt, lanthanum triflate, lanthanum mesolate, samarium triflate, samarium mesolate, 4,4'-dialkylaminopyridine, a 4,4'-dialkylaminopyridine containing compound, imidazole, methyl imidazole, benzyl imidazole, potassium permanganate, potassium peroxydisulfate, potassium peroxymonosulfate, potassium molybdate, hydrogen peroxide, chloroisocyanuric acid salt, sodium hypochlorite, potassium hypochlorite, hydrogen peroxide, oxidants, nucleophiles, hydroxide ions, catalytic enzymes, organophosphorous acid anhydrolase, o-iodosobenzoate, iodoxybenzoate, sodium perborate, sodium percarbonate, peracetic acid, m-chloroperoxybenzoic acid, magnesium monoperoxyphthalate, benzoyl peroxide, hydroperoxy carbonate, polyoxymetalate, a quaternary ammonium complex, or a mixture of two or more thereof.

33. The composition of claim 1 wherein the composition comprises a biocide, viricide, fungicide, sporicide, chemical warfare agent neutralizer and/or biological warfare agent neutralizers; the biocide, viricide, fungicide, sporicide, chemical warfare agent neutralizer and/or biological warfare agent neutralizer comprising sodium hypochlorite, potassium hypochlorite, a quaternary ammonium salt, quaternary ammonium chloride, quaternary ammonium bromide, didecyl ammonium chloride, didecyl dimethyl ammonium chloride, isothiazolin-benzalkonium chloride, sodium dichloroisocyanurate, bleach, potassium permanganate, potassium peroxydisulfate, potassium peroxymonosulfate, potassium molybdate, hydrogen peroxide, chloroisocyanuric acid salt, oxidants, nucleophiles, hydroxide ions, catalytic enzymes, o-iodosobenzoate, iodoxybenzoate, sodium perborate, sodium percarbonate, peracetic acid, m-chloroperoxybenzoic acid, magnesium monoperoxyphthalate, benzoyl peroxide, hydroperoxy carbonate ions, polyoxymetalate, quaternary ammonium complex, formaldehyde, glutaraldehyde, ortho-phthalaldehyde, phenol, cresol, triclosan, or a mixture of two or more thereof.

* * * * *